(12) United States Patent
Guan et al.

(10) Patent No.: US 10,931,334 B2
(45) Date of Patent: Feb. 23, 2021

(54) BEAM RECOVERY METHOD AND APPARATUS

(71) Applicant: HUAWEI TECHNOLOGIES CO., LTD., Guangdong (CN)

(72) Inventors: Peng Guan, Chengdu (CN); Xi Zhang, Chengdu (CN); Ying Sun, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/374,474

(22) Filed: Apr. 3, 2019

(65) Prior Publication Data

US 2019/0229777 A1    Jul. 25, 2019

Related U.S. Application Data

(63) Continuation of application No. PCT/CN2018/085733, filed on May 4, 2018.

(30) Foreign Application Priority Data

May 5, 2017   (CN) .......................... 201710315436.3

(51) Int. Cl.
*H04B 7/0408* (2017.01)
*H04W 72/04* (2009.01)
(Continued)

(52) U.S. Cl.
CPC ............ *H04B 7/0408* (2013.01); *H04L 5/00* (2013.01); *H04W 24/02* (2013.01); *H04W 72/04* (2013.01); *H04W 72/046* (2013.01); *H04W 72/12* (2013.01)

(58) Field of Classification Search
CPC ... H04B 7/0408; H04W 24/02; H04W 72/046
See application file for complete search history.

(56) References Cited

U.S. PATENT DOCUMENTS

2012/0114021 A1* 5/2012 Chung .................. H04B 7/155
                                                        375/211
2013/0279356 A1* 10/2013 Park ...................... H04W 24/02
                                                        370/252
(Continued)

FOREIGN PATENT DOCUMENTS

WO       2016127403 A1    8/2016
WO       2016140926 A1    9/2016
(Continued)

OTHER PUBLICATIONS

R2-1703562 Qualcomm Incorporated,"Beam recovery request",3GPP TSG-RAN WG2 Meeting #97bis,Spokane, USA, Apr. 3-7, 2017,total 3 pages.
(Continued)

*Primary Examiner* — Ian N Moore
*Assistant Examiner* — Rushil Parimal Sampat
(74) *Attorney, Agent, or Firm* — Fish & Richardson P.C.

(57) ABSTRACT

Embodiments of the present disclosure disclose a beam recovery method and apparatus. The method includes: sending, by a terminal device, a beam recovery request to a network device in a first time window using at least one beam, where the beam recovery request is a scheduling request or a beam failure recovery request; and receiving, by the terminal device in the first time window using the at least one beam, a beam recovery request response sent by the network device, where the beam recovery request response is a scheduling request response or a beam failure recovery request response.

8 Claims, 14 Drawing Sheets

(51) Int. Cl.
*H04W 24/02* (2009.01)
*H04L 5/00* (2006.01)
*H04W 72/12* (2009.01)

(56) References Cited

U.S. PATENT DOCUMENTS

2016/0353510 A1* 12/2016 Zhang .................. H04L 43/16
2019/0207665 A1* 7/2019 Yang .................. H04B 7/0619
2020/0052770 A1* 2/2020 Chen .................. H04L 5/0051

FOREIGN PATENT DOCUMENTS

WO 2017022902 A1 2/2017
WO 2017024516 A1 2/2017

OTHER PUBLICATIONS

R2-1703564 Qualcomm Incorporated,"Beam management",3GPP TSG-RAN WG2 Meeting #97bis,Spokane, USA, Apr. 3-7, 2017,total 4 pages.

R2-1703423 Intel Corporation,"Radio link monitoring, beam failure and radio link failure",3GPP TSG RAN WG2#97bis, Spokane, USA, Apr. 3-7, 2017,total 5 pages.

R1-1704553 CATT,"Discussion on beam recovery mechanism",3GPP TSG RAN WG1 Meeting #88bis,Spokane, USA Apr. 3-7, 2017,total 4 pages.

3GPP TS 38321 V0.0.3 (May 2017),3rd Generation Partnership Project;Technical Specification Group Radio Access Network;NR;Medium Access Control (MAC) protocol specification(Release 15),dated May 4, 2017,total 20 pages.

International Search Report and Written Opinion issued in International Application No. PCT/CN2018/085733 dated Jul. 26, 2018, 12 pages.

Extended European Search Report issued in European Application No. 18794965.6 dated Jul. 8, 2019, 10 pages.

R1-1700041—Huawei et al.,"Discussion on link recovery procedure for beam blockage," 3GPP TSG RAN WG1 NR Ad Hoc Meeting, Spokane, USA, Jan. 16-20, 2017, 6 pages.

InterDigital Communications, "Considerations on Beam Recovery for NR," 3GPP TSG RAN WG1 AH_NR Meeting, R1-1700723, Spokane, USA, Jan. 16-20, 2017, 8 pages.

Office Action issued in Chinese Application No. 201880028695.0 dated Jun. 30, 2020, 19 pages (with English translation).

* cited by examiner

BEAM RECOVERY METHOD AND APPARATUS

CROSS-REFERENCE TO RELATED APPLICATIONS

This application is a continuation of International Application No. PCT/CN2018/085733, filed on May 4, 2018, which claims priority to Chinese Patent Application No. 201710315436.3, filed on May 5, 2017; The disclosures of the aforementioned applications are hereby incorporated by reference in their entireties.

TECHNICAL FIELD

This application relates to the field of communications technologies, and in particular, to a beam recovery method and apparatus.

BACKGROUND

A beam is a communication resource, and different beams may be considered as different communication resources. In a mobile communications system, a beam is used for information transmission, to be specific, a higher antenna array gain can be implemented by sending a signal in a specific direction in space. A transmit beam may be signal strength distribution formed in different directions in space after a signal is transmitted by an antenna, and a receive beam may be signal strength distribution in different directions in space of a radio signal received from an antenna. A beam pair usually includes a transmit beam of a transmit end and a receive beam of a receive end. When performance of a beam associated with a downlink control channel decreases to a threshold, the beam fails, to be specific, the beam cannot be used for information transmission. Once the beam fails, a beam recovery mechanism is triggered.

In a Long Term Evolution (LTE) system, a random access scheme may be used in processes such as initial access in a radio link establishment process, link re-establishment after radio link establishment fails, or locating by using an uplink measurement-based locating method. The scheme may be specifically as follows: A terminal device sends a scheduling request (SR) to a network device, to notify the network device that the terminal device attempts to access the network device; the terminal device monitors a control channel in a preconfigured time window, to receive a random access response (RAR) delivered by the network device. The foregoing random access scheme is dedicated only for a scenario in which a network device receives one SR sent by a same terminal device.

When a downlink (DL) beam pair link fails, and duration of a beam failure is far less than a time window length of a radio link failure (RLF), to fully use existing resources, a terminal device may transmit SRs on a plurality of beams in different directions by using random access channel (RACH) resources, and a network device may receive the plurality of SRs from the same terminal device in a time window. However, a conventional random access processing procedure in LTE is dedicated only for a scenario in which a network device receives one SR sent by a same terminal device. How to perform random access processing when a network device receives a plurality of SRs sent by a same terminal device is a current problem that needs to be urgently resolved.

SUMMARY

A technical problem to be resolved in embodiments of the present disclosure is to provide a beam recovery method and apparatus, so that a network device can implement beam recovery processing on a plurality of beam recovery requests sent by a same terminal device, thereby improving beam recovery efficiency.

According to a first aspect, an embodiment of the present disclosure provides a beam recovery method. A terminal device sends a beam recovery request to a network device in a first time window by using at least one beam. The terminal device receives, in the first time window by using the at least one beam, a beam recovery request response sent by the network device.

The beam recovery request may be a scheduling request or a beam failure recovery request.

The beam recovery request response may be a scheduling request response or a beam failure recovery request response.

For example, when the beam recovery request is the scheduling request, the beam recovery request response may be the scheduling request response, and when the beam recovery request is the beam failure recovery request, the beam recovery request response may be the beam failure recovery request response.

The first time window may be a time window configured by the network device for the terminal device. For example, the first time window may include three symbols or seven symbols.

Optionally, a beginning symbol included in the first time window may be a symbol that first has a random access channel (RACH) resource configured.

In the technical solution, the terminal device may send the beam recovery request to the network device by using the at least one beam, and the terminal device may further receive, in the first time window by using the at least one beam, the beam recovery request response sent by the network device. The terminal device may send a plurality of beam recovery requests to the network device, so as to improve beam recovery efficiency.

Optionally, that a terminal device sends a beam recovery request to a network device in a first time window by using at least one beam may be specifically: the terminal device sends the beam recovery request to the network device on at least one symbol included in the first time window by using at least one same first beam.

The first beam may be a beam configured by the network device for the terminal device.

For example, the terminal device may send the beam recovery request to the network device on one symbol included in the first time window by using one first beam. For example, the first time window includes three symbols that are respectively a first symbol, a second symbol, and a third symbol. If the symbol determined by the terminal device in the first time window is the first symbol, the terminal device may send the beam recovery request to the network device on the first symbol included in the first time window by using the first beam.

For another example, the terminal device may send the beam recovery requests to the network device on one symbol included in the first time window by using a plurality of same first beams. For example, the first time window includes three symbols that are respectively a first symbol, a second symbol, and a third symbol. If the symbol determined by the terminal device in the first time window is the first symbol, the terminal device may send the beam recovery requests to the network device on the first symbol included in the first time window by using the first beams in different directions.

For another example, the terminal device may send the beam recovery requests to the network device on a plurality of symbols included in the first time window by using one first beam. For example, the first time window includes three symbols that are respectively a first symbol, a second symbol, and a third symbol. If the plurality of symbols determined by the terminal device in the first time window include the second symbol and the third symbol, the terminal device may send the beam recovery request to the network device on the second symbol included in the first time window by using the first beam, and send the beam recovery request to the network device on the third symbol included in the first time window by using the first beam.

For another example, the terminal device may send the beam recovery requests to the network device on a plurality of symbols included in the first time window by using a plurality of same first beams. For example, the first time window includes three symbols that are respectively a first symbol, a second symbol, and a third symbol. If the plurality of symbols determined by the terminal device in the first time window include the second symbol and the third symbol, the terminal device may send the beam recovery request to the network device on the second symbol included in the first time window by using the first beam, and send the beam recovery request to the network device on the third symbol included in the first time window by using the first beam.

In the technical solution, the terminal device may send the beam recovery requests to the network device on one symbol by using a plurality of same first beams, or send the beam recovery requests to the network device on a plurality of symbols by using one or more same first beams, so that a same terminal device sends a plurality of beam recovery requests to the network device.

Optionally, that the terminal device receives, in the first time window by using the at least one beam, a beam recovery request response sent by the network device may be specifically: the terminal device receives the beam recovery request response on at least one symbol included in the first time window by using the first beam.

In the technical solution, after the terminal device sends the beam recovery request to the network device on at least one symbol included in the first time window by using the at least one same first beam, the terminal device may receive the beam recovery request response on at least one symbol included in the first time window by using the first beam, so as to ensure that a beam used to send the beam recovery request and a beam used to receive the beam recovery request response are a same beam.

Optionally, the first time window may include a first unit time window and a second unit time window, and that a terminal device sends a beam recovery request to a network device in a first time window by using at least one beam may be specifically: the terminal device sends the beam recovery request to the network device on at least one symbol included in the first unit time window by using at least one same first beam.

The first unit time window may be a time window configured by the network device for the terminal device. For example, the first unit time window may include three symbols or four symbols.

The second unit time window may be a time window configured by the network device for the terminal device. For example, the second unit time window may include four symbols or five symbols.

A beginning symbol included in the second unit time window is a symbol immediately following a last symbol included in the first unit time window. For example, the first unit time window includes four symbols that are respectively a symbol 0, a symbol 1, a symbol 2, and a symbol 3, and if a symbol immediately following the symbol 3 is a symbol 4, the terminal device may determine that the beginning symbol included in the second unit time window is the symbol 4. It should be noted that the first unit time window in this embodiment of the present disclosure includes but is not limited to four symbols, and a length of the first unit time window and a length of the second unit time window may be the same, or may be different. This is not specifically limited in this embodiment of the present disclosure.

Optionally, that the terminal device receives, in the first time window by using the at least one beam, a beam recovery request response sent by the network device may be specifically: the terminal device receives the beam recovery request response on at least one symbol included in the second unit time window by using the first beam.

In the technical solution, after the terminal device sends the beam recovery request to the network device on the at least one symbol included in the first unit time window by using the at least one same first beam, the terminal device may receive the beam recovery request response on the at least one symbol included in the second unit time window by using the first beam, so as to ensure that a beam used to send the beam recovery request and a beam used to receive the beam recovery request response are a same beam.

Optionally, when the beam recovery request response is not received in the first time window, the terminal device may determine a third time window configured by the network device for the terminal device, and send the beam recovery request to the network device on at least one symbol included in the third time window by using at least one same second beam.

The third time window may be a time window configured by the network device for the terminal device. For example, the third time window may include three symbols or five symbols.

In the technical solution, when the terminal device detects no beam recovery request response in the first time window, the terminal device may re-send the beam recovery request to the network device in the third time window by using a beam other than the first beam. If the terminal device receives, on at least one symbol included in the third time window by using the second beam, the beam recovery request response sent by the network device, beam recovery can be implemented, thereby improving beam recovery reliability.

Optionally, the first time window may include a third unit time window and a fourth unit time window, and that a terminal device sends a beam recovery request to a network device in a first time window by using at least one beam may be specifically: the terminal device sends the beam recovery request to the network device on at least one symbol included in the third unit time window by using at least one different beam.

The third unit time window may be a time window configured by the network device for the terminal device. For example, the third unit time window may include three symbols or five symbols.

The fourth unit time window may be a time window configured by the network device for the terminal device. For example, the fourth unit time window may include four symbols or five symbols.

A beginning symbol included in the fourth unit time window may be a symbol immediately following a last symbol included in the third unit time window. For example, the third unit time window includes four symbols that are respectively a symbol 0, a symbol 1, a symbol 2, and a symbol 3, and if a symbol immediately following the symbol 3 is a symbol 4, the terminal device may determine that the beginning symbol included in the fourth unit time window is the symbol 4. It should be noted that the third unit time window in this embodiment of the present disclosure includes but is not limited to four symbols, and a length of the third unit time window and a length of the fourth unit time window may be the same, or may be different. This is not specifically limited in this embodiment of the present disclosure.

The network device may configure a maximum quantity of beams for the terminal device. For example, a quantity of beams that are allowed to be used by the terminal device to send the beam recovery request may be less than or equal to 5. It should be noted that the maximum quantity of beams in this embodiment of the present disclosure includes but is not limited to 5. For example, the maximum quantity of beams may be 3 or the like. This is not specifically limited in this embodiment of the present disclosure.

A total quantity of symbols included in the third unit time window may be determined based on the maximum quantity of beams that is configured by the network device for the terminal device. For example, the total quantity of symbols included in the third unit time window may be directly proportional to the maximum quantity of beams. For example, if the maximum quantity of beams is 5, the total quantity of symbols included in the third unit time window may be 5, in other words, the third unit time window includes five symbols.

For example, the terminal device may send the beam recovery request to the network device on one symbol included in the third unit time window by using one beam. For example, the third unit time window includes five symbols that are respectively a first symbol, a second symbol, a third symbol, a fourth symbol, and a fifth symbol. If the symbol determined by the terminal device in the third unit time window is the first symbol, the terminal device may send the beam recovery request to the network device on the first symbol included in the third unit time window by using a beam 1. The beam 1 may be a beam determined by the terminal device, and the beam may be configured by the network device for the terminal device.

For another example, the terminal device may send the beam recovery requests to the network device on one symbol included in the third unit time window by using a plurality of different beams. For example, the third unit time window includes five symbols that are respectively a first symbol, a second symbol, a third symbol, a fourth symbol, and a fifth symbol. If the symbol determined by the terminal device in the third unit time window is the first symbol, the terminal device may send the beam recovery requests to the network device on the first symbol included in the third unit time window by using a plurality of beams in a beam 1 to a beam 5 in different directions. If the maximum quantity of beams that is configured by the network device for the terminal device is 5, the terminal device may send the beam recovery requests to the network device on the first symbol included in the third unit time window by using two to five beams.

For another example, the terminal device may send the beam recovery requests to the network device on a plurality of symbols included in the third unit time window by using one beam. For example, the third unit time window includes five symbols that are respectively a first symbol, a second symbol, a third symbol, a fourth symbol, and a fifth symbol. If the plurality of symbols determined by the terminal device in the third unit time window include the second symbol and the third symbol, the terminal device may send the beam recovery request to the network device on the second symbol included in the third unit time window by using a beam 1, and send the beam recovery request to the network device on the third symbol included in the third unit time window by using the beam 1.

For another example, the terminal device may send the beam recovery requests to the network device on a plurality of symbols included in the third unit time window by using a plurality of different beams. For example, the third unit time window includes five symbols that are respectively a first symbol, a second symbol, a third symbol, a fourth symbol, and a fifth symbol. If the plurality of symbols determined by the terminal device in the third unit time window include the second symbol and the third symbol, the terminal device may send the beam recovery requests to the network device on the second symbol included in the third unit time window by using a plurality of beams in a beam 1 to a beam 5 in different directions, and send the beam recovery requests to the network device on the third symbol included in the third unit time window by using a plurality of beams in the beam 1 to the beam 5 in the different directions.

In the technical solution, the terminal device may send the beam recovery requests to the network device on one symbol by using a plurality of different beams, or send the beam recovery requests to the network device on a plurality of symbols by using one or more different beams, so that a same terminal device sends a plurality of beam recovery requests to the network device.

Optionally, that the terminal device receives, in the first time window by using the at least one beam, a beam recovery request response sent by the network device may be specifically: the terminal device receives the beam recovery request response on at least one symbol included in the fourth unit time window by using the at least one different beam.

In the technical solution, after the terminal device sends the beam recovery request to the network device on the at least one symbol included in the third unit time window by using the at least one different beam, the terminal device may receive the beam recovery request response on the at least one symbol included in the fourth unit time window by using the at least one different beam, so as to ensure that a beam used to send the beam recovery request and a beam used to receive the beam recovery request response are a same beam.

Optionally, that a terminal device sends a beam recovery request to a network device in a first time window by using at least one beam may be specifically: the terminal device sends, based on beam request indication information configured by the network device for the terminal device, the beam recovery request to the network device in the first time window by using the at least one beam, where the beam request indication information is used to indicate a sending manner of the beam recovery request.

For example, when the beam request indication information is used to indicate that the sending manner of the beam recovery request is to send the beam recovery request on at least one symbol included in the first time window by using at least one same first beam, the terminal device may send the beam recovery request to the network device on the at least one symbol included in the first time window by using the at least one same first beam, and receive the beam recovery request response on at least one symbol included in the first time window by using the first beam.

For another example, when the beam request indication information is used to indicate that the sending manner of the beam recovery request is to send the beam recovery request on at least one symbol included in the first unit time window by using at least one same first beam, the terminal device may send the beam recovery request to the network device on the at least one symbol included in the first unit time window by using the at least one same first beam, and receive the beam recovery request response on at least one symbol included in the second unit time window by using the first beam.

For another example, when the beam request indication information is used to indicate that the sending manner of the beam recovery request is to send the beam recovery request on at least one symbol included in the third unit time window by using at least one different beam, the terminal device may send the beam recovery request to the network device on the at least one symbol included in the third unit time window by using the at least one different beam, and receive the beam recovery request response on at least one symbol included in the fourth unit time window by using the at least one different beam.

According to a second aspect, an embodiment of the present disclosure provides a beam recovery method. A network device receives a beam recovery request sent by a terminal device in a first time window by using at least one beam, determines a beam recovery request in the received beam recovery request in a second time window, and sends a beam recovery request response to the terminal device by using a beam corresponding to the determined beam recovery request.

In the technical solution, the network device may receive a plurality of beam recovery requests sent by the terminal device, determines a beam recovery request in the received beam recovery requests, and sends the beam recovery request response to the terminal device by using a beam corresponding to the determined beam recovery request, so that the network device can implement beam recovery processing on a plurality of beam recovery requests sent by a same terminal device, thereby improving beam recovery efficiency.

Optionally, that a network device determines a beam recovery request in the received beam recovery request may be specifically: the network device responds to a beam recovery request received in the second time window and carried on a beam whose quality is best.

For example, if the terminal device sends the beam recovery request to the network device on at least one symbol included in a third unit time window by using at least one different beam, the network device may determine, in the beam recovery request received in the second time window, the beam recovery request carried on the beam whose quality is best, and respond to the determined beam recovery request.

For another example, if the terminal device sends the beam recovery request to the network device on at least one symbol included in a first unit time window by using at least one same first beam, the network device may determine, in the beam recovery request received in the second time window, the beam recovery request carried in the beam whose quality is best, and respond to the determined beam recovery request.

Optionally, that a network device determines a beam recovery request in the received beam recovery request may be specifically: the network device responds to a beam recovery request first received in the second time window.

For example, if the terminal device sends the beam recovery request to the network device on at least one symbol included in the first time window by using at least one same first beam, the network device may determine a first received beam recovery request in the beam recovery request received in the second time window, and respond to the determined beam recovery request.

For another example, if the terminal device sends the beam recovery request to the network device on at least one symbol included in a first unit time window by using at least one same first beam, the network device may determine a first received beam recovery request in the beam recovery request received in the second time window, and respond to the determined beam recovery request.

For another example, if the terminal device sends the beam recovery request to the network device on at least one symbol included in a third unit time window by using at least one different beam, the network device may determine the first received beam recovery request in the beam recovery request received in the second time window, and respond to the determined beam recovery request.

Optionally, that a network device sends a beam recovery request response to the terminal device by using a beam corresponding to the determined beam recovery request may be specifically: the network device sends the beam recovery request response to the terminal device in the second time window by using the beam corresponding to the determined beam recovery request.

Optionally, that a network device sends a beam recovery request response to the terminal device by using a beam corresponding to the determined beam recovery request may be specifically: the network device sends the beam recovery request response to the terminal device beyond the second time window by using the beam corresponding to the determined beam recovery request.

According to a third aspect, an embodiment of the present disclosure provides a computer storage medium. The computer storage medium stores a program, and when being executed, the program includes all or some steps of the beam recovery method according to the first aspect of the embodiments of the present disclosure.

According to a fourth aspect, an embodiment of the present disclosure provides a computer storage medium. The computer storage medium stores a program, and when being executed, the program includes all or some steps of the beam recovery method according to the second aspect of the embodiments of the present disclosure.

According to a fifth aspect, an embodiment of the present disclosure provides a beam recovery apparatus. The beam recovery apparatus includes modules configured to perform the beam recovery method according to the first aspect of the embodiments of the present disclosure.

According to a sixth aspect, an embodiment of the present disclosure provides a beam recovery apparatus. The beam recovery apparatus includes modules configured to perform the beam recovery method according to the second aspect of the embodiments of the present disclosure.

According to a seventh aspect, an embodiment of the present disclosure provides a terminal device, including a processor, a memory, and a transceiver. The memory stores a set of program code, and by invoking the program code stored in the memory, the processor is configured to perform the following operations:

sending a beam recovery request to a network device in a first time window by using at least one beam; and receiving, in the first time window by using the at least one beam, a beam recovery request response sent by the network device.

According to an eighth aspect, an embodiment of the present disclosure provides a network device, including a processor, a memory, and a transceiver. The memory stores a set of program code, and by invoking the program code stored in the memory, the processor is configured to perform the following operations:

receiving a beam recovery request sent by a terminal device in a first time window by using at least one beam, determining a beam recovery request in the received beam recovery request in a second time window, and sending a beam recovery request response to the terminal device by using a beam corresponding to the determined beam recovery request.

According to a ninth aspect, an embodiment of the present disclosure provides a beam recovery system, including the terminal device according to the seventh aspect of the embodiments of the present disclosure and the network device according to the eighth aspect of the embodiments of the present disclosure.

According to a tenth aspect, an embodiment of this application provides a communications chip. The communications chip stores an instruction, and when being run on a terminal device, the instruction enables the communications chip to perform the method according to the first aspect.

According to an eleventh aspect, an embodiment of this application provides a communications chip. The communications chip stores an instruction, and when being run on a network device, the instruction enables the communications chip to perform the method according to the second aspect.

BRIEF DESCRIPTION OF DRAWINGS

To describe the technical solutions in the embodiments of the present disclosure or in the background more clearly, the following describes the accompanying drawings required for describing the embodiments of the present disclosure or the background.

DESCRIPTION OF EMBODIMENTS

The following describes the embodiments of the present disclosure with reference to the accompanying drawings in the embodiments of the present disclosure.

Figure 1:
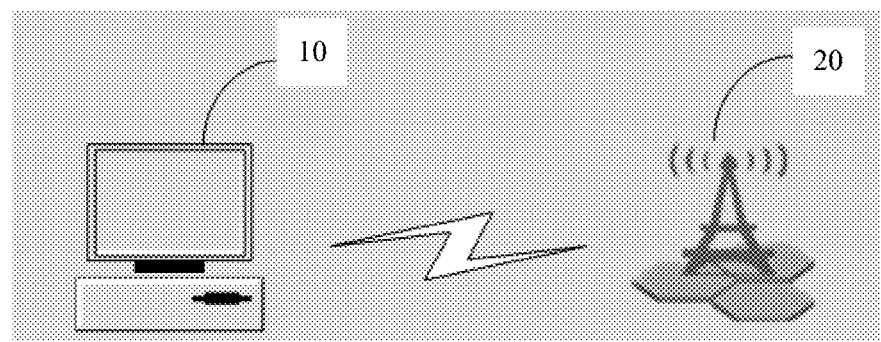
FIG. 1 is a schematic architectural diagram of a beam recovery system according to an embodiment of the present disclosure.

To better understand a beam recovery method and apparatus disclosed in the embodiments of the present disclosure, the following first describes a network architecture applicable to the embodiments of the present disclosure. FIG. 1 is a schematic architectural diagram of a beam recovery system according to an embodiment of the present disclosure. As shown in FIG. 1, the beam recovery system may include a terminal device 10 and a network device 20. Data transmission may be performed between the terminal device 10 and the network device 20 by using a communication connection.

The terminal device 10 in this embodiment of the present disclosure may be referred to as user equipment (UE), a mobile console, an access terminal, a subscriber unit, a subscriber station, a mobile station, a remote station, a remote terminal, a mobile device, a terminal, a wireless communications device, a user agent, a user apparatus, or the like. The terminal device 10 may be specifically any one of a station (STA) in a WLAN, a cellular phone, a cordless telephone set, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a mobile console in a future 5G network, and a terminal device in a further evolved public land mobile network (PLMN).

The network device 20 in this embodiment of the present disclosure may be a device that can communicate with the terminal device 10. The network device 20 may be a base station, a relay station, or an access point. The base station may be a base transceiver station (BTS) in a Global System for Mobile Communications (GSM) or Code Division Multiple Access (CDMA) network, or may be an NB (NodeB) in Wideband Code Division Multiple Access (WCDMA), or may be an eNB or an eNodeB (Evolved NodeB) in Long Term Evolution (LTE). Alternatively, the network device 20 may be a radio controller in a cloud radio access network (CRAN) scenario. Alternatively, the network device 20 may be a network device in a future 5G network or a network device in a future evolved PLMN. Alternatively, the network device 20 may be a wearable device or an in-vehicle device.

It should be understood that the technical solution of this embodiment of the present disclosure may be applied to various communications systems, such as a GSM, a CDMA system, a WCDMA system, a general packet radio service (GPRS), an LTE system, an LTE frequency division duplex (FDD) system, an LTE time division duplex (TDD) system, a Universal Mobile Telecommunication System (UMTS), and a Worldwide Interoperability for Microwave Access (WiMAX) communications system.

In this embodiment of the present disclosure, any device that can perform data communication with a base station may be understood as the terminal device 10, and in this embodiment of the present disclosure, the terminal device is described in a general sense. In this embodiment of the present disclosure, the network device 20 may configure an allowed maximum quantity of beams for the terminal device 10 by using signaling, and the terminal device 10 may send a beam recovery request to the network device 20 by using a quantity of beams that is less than or equal to the maximum quantity of beams. In this embodiment of the present disclosure, the network device 20 may configure a first time window for the terminal device 10, the first time window may include any one of one subframe, one timeslot, and one or more symbols, and the terminal device 10 may send the beam recovery request to the network device 20 in the first time window by using at least one beam. In this embodiment of the present disclosure, the network device 20 may configure a third time window for the terminal device 10, and the third time window may include any one of one subframe, one timeslot, and one or more symbols. After the terminal device 10 sends the beam recovery request to the network device 20 in the first time window by using at least one first beam, when the terminal device 10 receives, in the first time window, no beam recovery request response sent by the network device 20, the terminal device 10 may send the beam recovery request to the network device in the third time window by using at least one second beam. In this embodiment of the present disclosure, the network device 20 may configure a second time window on a network device 20 side, and the second time window may include any one of one subframe, one timeslot, and one or more symbols. After receiving the beam recovery request sent by the terminal device 10 in the first time window by using the at least one beam, the network device 20 may determine a beam recovery request in the received beam recovery request in the second time window.

In this embodiment of the present disclosure, the terminal device 10 sends the beam recovery request to the network device 20 in at least two sending manners, so as to implement beam recovery.

In a first sending manner, the terminal device 10 sends the beam recovery request to the network device 20 on at least one symbol included in the first time window by using at least one same first beam, and receives, on at least one symbol included in the first time window by using the first beam, the beam recovery request response sent by the network device 20.

Figure 2A:
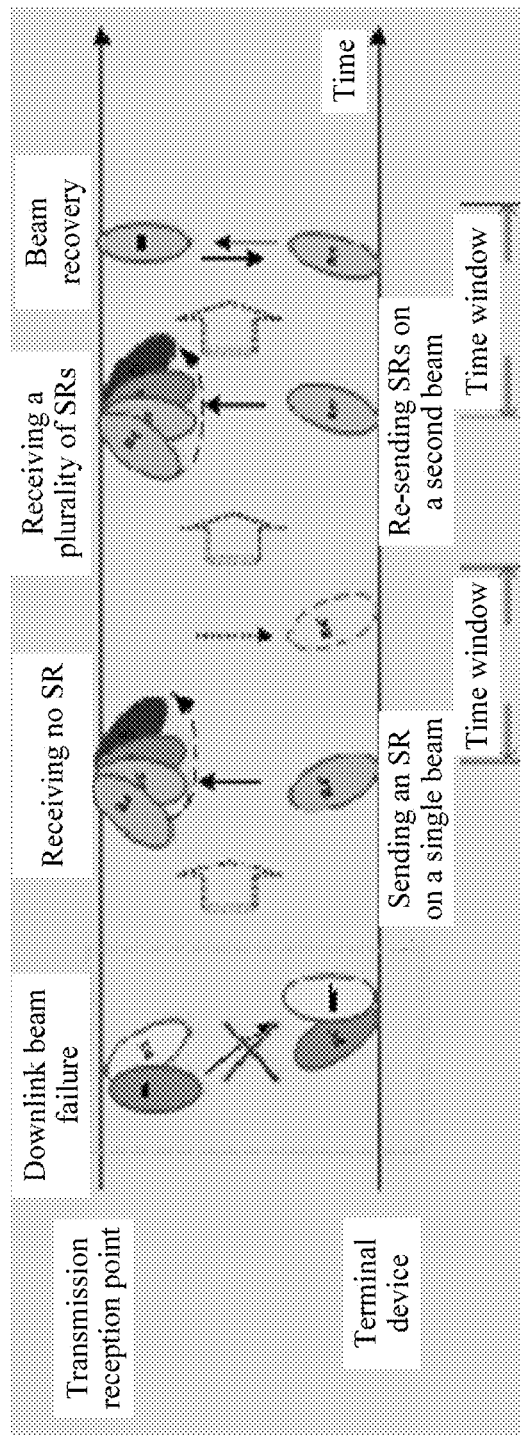
FIG. 2A is a schematic diagram of information transmission according to an embodiment of the present disclosure.

In an example of a schematic diagram of information transmission shown in FIG. 2A, the terminal device 10 sends the beam recovery request to the network device 20 on the at least one symbol included in the first time window by using at least one same first beam B4'. The network device 20 detects, in a receive RACH beam scanning manner, the beam recovery request sent by the terminal device 10. When the network device 20 receives, in the second time window, the beam recovery request sent by the terminal device 10, the network device 20 may respond to the beam recovery request by using a physical downlink control channel (PDCCH). When the terminal device 10 receives, in the first time window, no beam recovery request response sent by the network device 20, the terminal device 10 may send the beam recovery request to the network device on at least one symbol included in the second time window by using at least one same second beam B5'. When the terminal device 10 receives, in the second time window, the beam recovery request response sent by the network device 20, the terminal device 10 may determine that beam recovery is implemented.

In a second sending manner, if the first time window includes a third unit time window and a fourth unit time window, the terminal device 10 may send the beam recovery request to the network device 20 on at least one symbol included in the third unit time window by using at least one different beam, and receive, on at least one symbol included in the fourth unit time window by using the at least one different beam, the beam recovery request response sent by the network device 20.

Figure 2B:
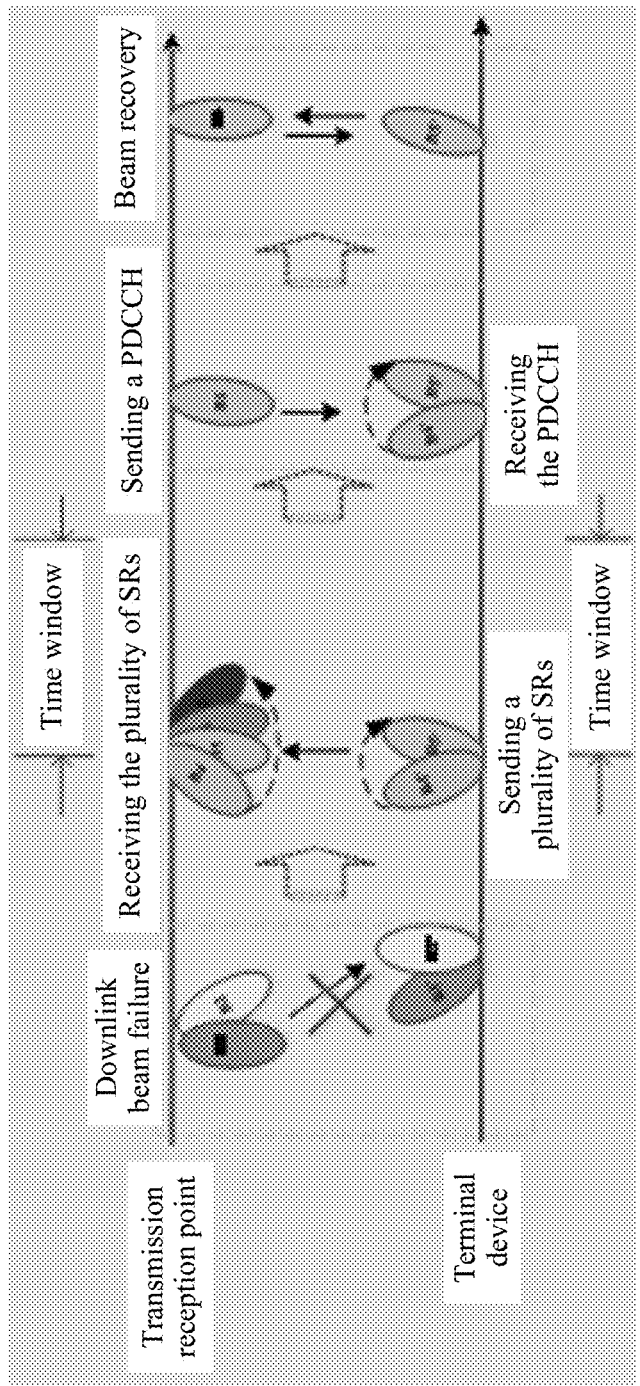
FIG. 2B is a schematic diagram of information transmission according to another embodiment of the present disclosure.

In an example of a schematic diagram of information transmission shown in FIG. 2B, the terminal device 10 sends the beam recovery requests to the network device 20 on at least one symbol included in the third unit time window by using a plurality of different beams. After receiving, in the second time window, a plurality of beam recovery requests sent by the terminal device 10, the network device 20 may determine a beam recovery request in the plurality of beam recovery requests. The network device 20 may send the beam recovery request response to the terminal device 10 by using a beam corresponding to the determined beam recovery request. The terminal device 10 may detect, in a beam scanning manner, the beam recovery request response sent by the network device 20. When the terminal device 10 receives the beam recovery request response sent by the network device 20, the terminal device 10 may determine that beam recovery is implemented.

Compared with the first sending manner, in the second sending manner in this embodiment of the present disclosure, the beam recovery requests may be sent to the network device 20 by using a plurality of different beams, thereby reducing a delay and improving beam recovery efficiency.

Figure 3:
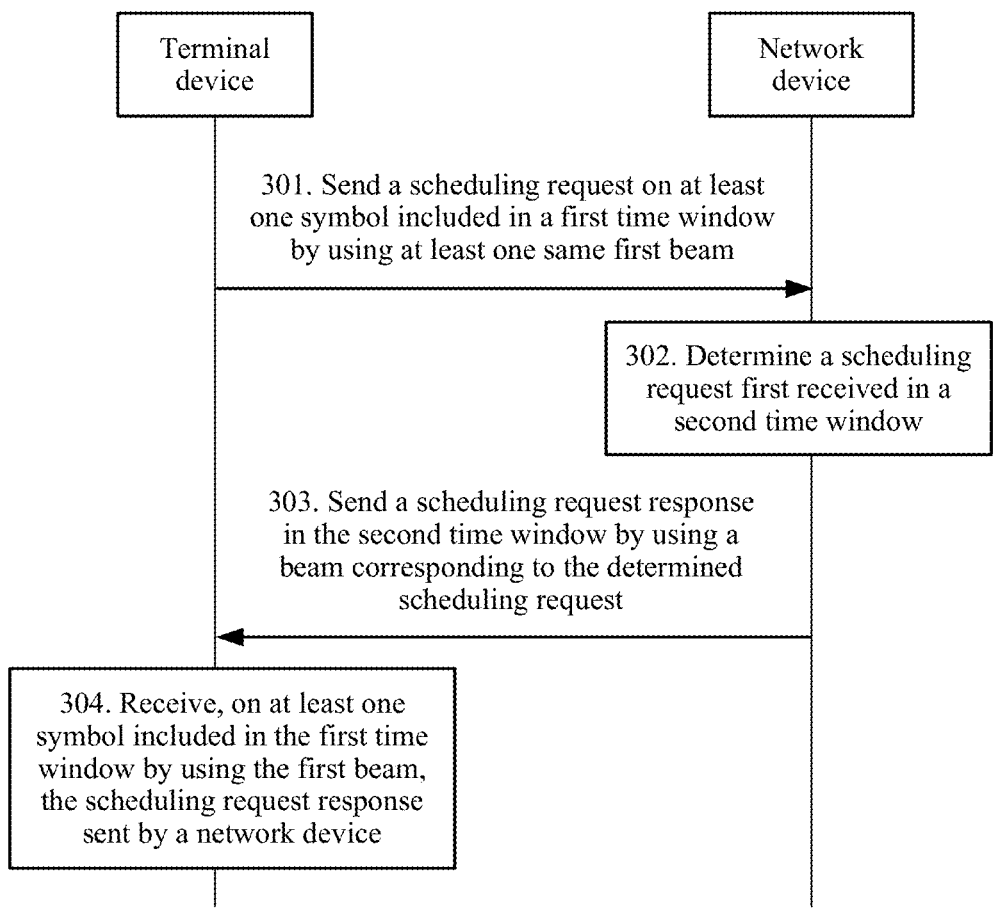
FIG. 3 is a schematic flowchart of a beam recovery method according to an embodiment of the present disclosure.

Based on the schematic architectural diagram of the beam recovery system shown in FIG. 1, FIG. 3 is a schematic flowchart of a beam recovery method according to an embodiment of the present disclosure. The method includes but is not limited to the following steps.

Step S301: A terminal device sends a scheduling request to a network device on at least one symbol included in a first time window by using at least one same first beam.

Specifically, when a downlink (DL) beam fails, the terminal device may send the scheduling request to the network device on the at least one symbol included in the first time window by using the at least one same first beam. The first beam may be a beam configured by the network device for the terminal device, for example, a beam 1.

For example, the terminal device may select a symbol (for example, a symbol 3) in the first time window, and send the scheduling request to the network device on the symbol 3 by using one beam 1. For another example, the terminal device may select a symbol (for example, a symbol 3) in the first time window, and send the scheduling requests to the network device on the symbol 3 by using a plurality of beams 1, to be specific, the terminal device sends the scheduling requests to the network device on the symbol 3 by using the beams 1 in different directions. For another example, in an example of a schematic diagram of information transmission shown in FIG. 4, the terminal device may select a plurality of symbols (for example, a symbol 3 and a symbol 4) in the first time window, send the scheduling request to the network device on the symbol 3 by using one beam 1, and send the scheduling request to the network device on the symbol 4 by using the beam 1. For another example, the terminal device may select a plurality of symbols (for example, a symbol 3 and a symbol 4) in the first time window, send the scheduling requests to the network device on the symbol 3 by using a plurality of beams 1, and send the scheduling requests to the network device on the symbol 4 by using the plurality of beams 1.

In this embodiment of the present disclosure, the terminal device sends the scheduling requests to the network device on the at least one symbol included in the first time window by using a plurality of same first beams, so as to increase a subcarrier spacing.

In this embodiment of the present disclosure, the network device may configure the first time window for the terminal device. A start moment of the first time window may be the first symbol that has a RACH resource configured. In the example of the schematic diagram of information transmission shown in FIG. 4, if the first symbol that has a RACH resource configured is the symbol 3, the terminal device may determine that the start moment of the first time window is the symbol 3.

A length of the first time window may be a fixed length, for example, seven symbols. Optionally, the length of the first time window may be configured by the network device, for example, three symbols or five symbols.

The network device may send length indication information to the terminal device, to indicate the length of the first time window. Optionally, the length of the first time window may be indicated by using a direct method. For example, if the length indication information is 5, the terminal device may determine that the length of the first time window is five symbols. Optionally, the length of the first time window may be described in a mapping manner. For example, a mapping relationship between the length indication information and the length of the first time window is shown in Table 1:

TABLE 1

| Length indication information | Length of the first time window |
|---|---|
| 00 | Three symbols |
| 01 | Four symbols |
| 10 | Five symbols |
| 11 | Seven symbols |

It can be learned from Table 1 that when the length indication information is 00 in binary, the terminal device may determine that the length of the first time window is three symbols, and when the length indication information is 11 in binary, the terminal device may determine that the length of the first time window is seven symbols. It should be noted that the mapping relationship between the length indication information and the length of first time window in this embodiment of the present disclosure includes but is not limited to the foregoing manner, and research and development personnel may perform modification with reference to different scenarios. This is not specifically limited in this embodiment of the present disclosure.

The network device may configure the first time window for the terminal device by using signaling, for example, Radio Resource Control (RRC), a Media Access Control-control element (MAC-CE), or downlink control information (DCI).

The network device may send the length indication information to the terminal device, to notify the terminal device that the first time window is configured.

Step S302: The network device determines a scheduling request first received in a second time window.

Specifically, the network device may receive, in the second time window in a receive RACH beam scanning manner, the scheduling request sent by the terminal device, and determine the scheduling request first received in the second time window.

The network device may configure the second time window on a network device side, and a beginning symbol included in the second time window may be the same as a beginning symbol included in a first unit time window.

A length of the second time window may be a fixed length, for example, four symbols. Optionally, the length of the second time window may be configured by the network device, for example, three symbols or five symbols.

Step S303: The network device sends a scheduling request response to the terminal device in the second time window by using a beam corresponding to the determined scheduling request.

During specific implementation, the network device may obtain a beam carrying the determined scheduling request, determine the other beam included in a beam pair to which the beam belongs, and send the scheduling request response to the terminal device in the second time window by using the determined beam. A beam pair may include a transmit beam of a transmit end and a receive beam of a receive end. For example, the beam carrying the determined scheduling request is a beam 1, the beam 1 and a beam 3 constitute a beam pair, and the network device may send the scheduling request response to the terminal device in the second time window by using the beam 3.

Figure 4:
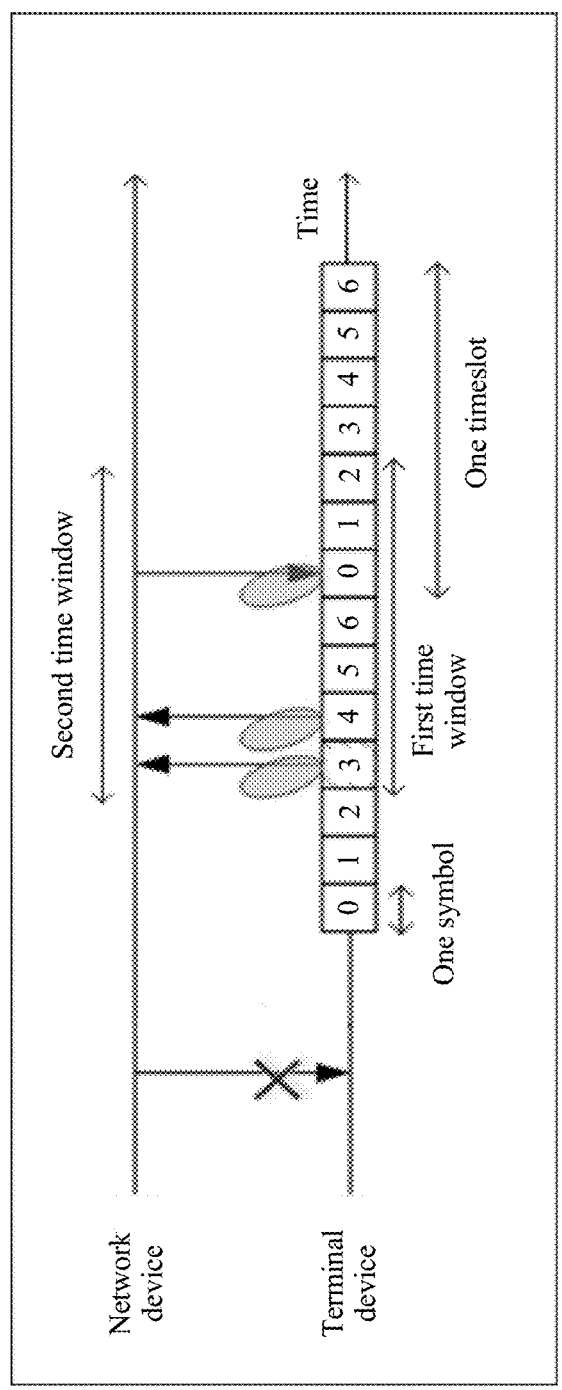
FIG. 4 is a schematic diagram of information transmission according to another embodiment of the present disclosure.

In the example of the schematic diagram of information transmission shown in FIG. 4, the network device may send the scheduling request response to the terminal device on a symbol 0 included in the second time window by using the other beam included in a beam pair to which the first beam belongs.

Optionally, the network device may send the scheduling request response to the terminal device by using a PDCCH. For example, the terminal device may receive, in a same subframe, a plurality of DCI messages carried on different PDCCHs. For a DCI message carried on one PDCCH, one CRC may be attached to each DCI message. A C-RNTI of the terminal device may be included in CRC calculation and is implicitly transmitted. The network device may determine, based on the C-RNTI of the terminal device, DCI to which a CRC including the C-RNTI belongs, further determine a PDCCH carrying the DCI, and send the scheduling request response to the terminal device by using the determined PDCCH. The DCI may include downlink scheduling allocation, an uplink scheduling request, power control, and the like.

Optionally, the network device may send the scheduling request response to the terminal device by using a MAC-CE. For example, the network device may define a new MAC-CE, and send the MAC-CE to the terminal device. The MAC-CE may carry the scheduling request response.

Optionally, the network device may send the scheduling request response to the terminal device by using RRC. For example, the network device may define a new RRC IE, and send the RRC IE to the terminal device. The RRC IE may carry the scheduling request response.

Optionally, the network device may send the scheduling request response to the terminal device by using a physical downlink shared channel (PDSCH).

Step S304: The terminal device receives, on at least one symbol included in the first time window by using the first beam, the scheduling request response sent by the network device.

The terminal device may receive, on the at least one symbol included in the first time window by using the first beam, the scheduling request response sent by the network device. For example, if the terminal device sends the scheduling request to the network device on at least one symbol included in the first time window by using the beam 1, the terminal device may receive, on at least one symbol included in the first time window by using the beam 1, the scheduling request response sent by the network device.

Compared with a conventional beam recovery method in which at least two subframes are spaced between a receiving time when a terminal device receives a scheduling request response and a sending time when the terminal device sends a scheduling request, in this embodiment of the present disclosure, the first time window is spaced at most between a receiving time when the terminal device receives the scheduling request response and a sending time when the terminal device sends the scheduling request, for example, seven symbols, thereby reducing a delay and improving beam recovery efficiency.

In the method described in FIG. 3, the terminal device sends the scheduling request to the network device on the at least one symbol included in the first time window by using the at least one same first beam. The network device determines the scheduling request first received in the second time window, and the network device sends the scheduling request response to the terminal device in the second time window by using the beam corresponding to the determined scheduling request. The terminal device receives, on the at least one symbol included in the first time window by using the first beam, the scheduling request response sent by the network device, so that the network device can implement beam recovery processing on a plurality of scheduling requests sent by a same terminal device, thereby improving beam recovery efficiency.

Figure 5:
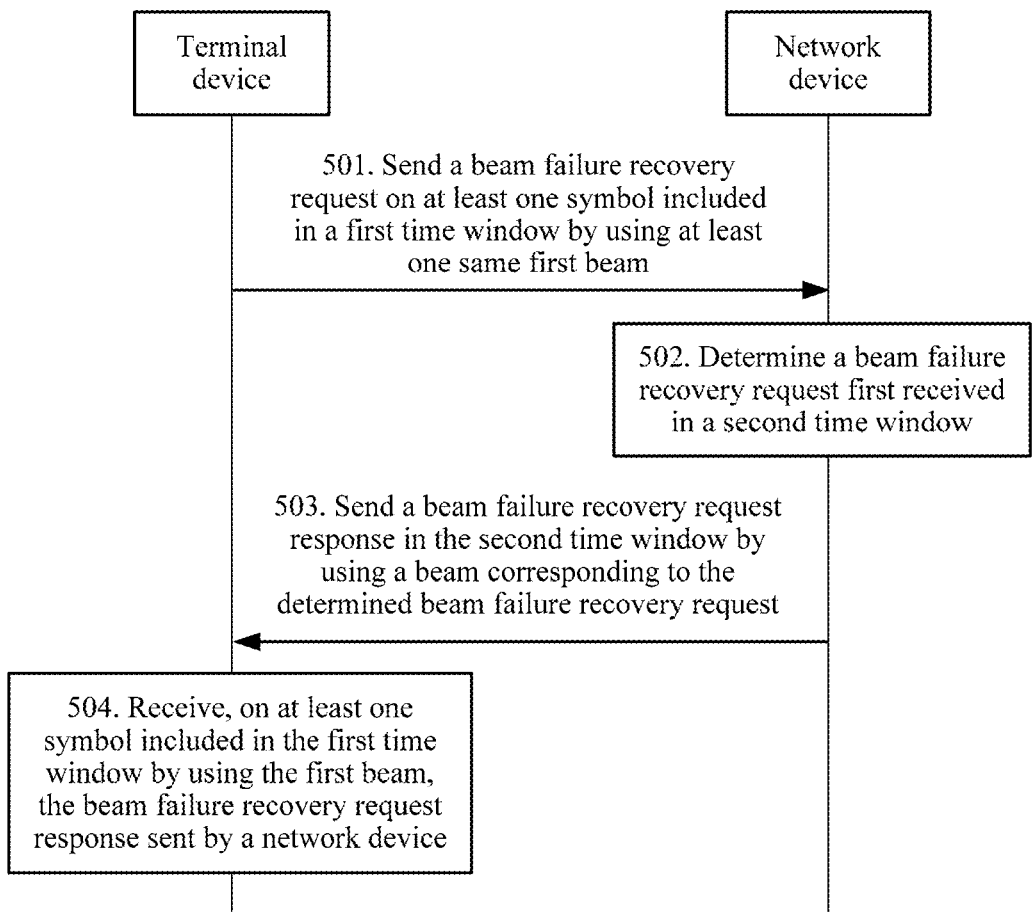
FIG. 5 is a schematic flowchart of a beam recovery method according to another embodiment of the present disclosure.

Based on the schematic architectural diagram of the beam recovery system shown in FIG. 1, FIG. 5 is a schematic flowchart of a beam recovery method according to an embodiment of the present disclosure. The method includes but is not limited to the following steps.

Step S501: A terminal device sends a beam failure recovery request to a network device on at least one symbol included in a first time window by using at least one same first beam.

Specifically, when a DL beam fails, the terminal device may send the beam failure recovery request to the network device on the at least one symbol included in the first time window by using the at least one same first beam. The first beam may be a beam configured by the network device for the terminal device, for example, a beam 1.

For example, the terminal device may select a symbol (for example, a symbol 3) in the first time window, and send the beam failure recovery request to the network device on the symbol 3 by using one beam 1. For another example, the terminal device may select a symbol (for example, a symbol 3) in the first time window, and send the beam failure recovery requests to the network device on the symbol 3 by using a plurality of beams 1, to be specific, the terminal device sends the beam failure recovery requests to the network device on the symbol 3 by using the beams 1 in different directions. For another example, in the example of the schematic diagram of information transmission shown in FIG. 4, the terminal device may select a plurality of symbols (for example, a symbol 3 and a symbol 4) in the first time window, send the beam failure recovery request to the network device on the symbol 3 by using one beam 1, and send the beam failure recovery request to the network device on the symbol 4 by using the beam 1. For another example, the terminal device may select a plurality of symbols (for example, a symbol 3 and a symbol 4) in the first time window, send the beam failure recovery requests to the network device on the symbol 3 by using a plurality of beams 1, and send the beam failure recovery requests to the network device on the symbol 4 by using the plurality of beams 1.

In this embodiment of the present disclosure, the terminal device sends the beam failure recovery requests to the network device on the at least one symbol included in the first time window by using a plurality of same first beams, so as to increase a subcarrier spacing.

In this embodiment of the present disclosure, the network device may configure the first time window for the terminal device. A start moment of the first time window may be the first symbol that has a RACH resource configured. In the example of the schematic diagram of information transmission shown in FIG. 4, if the first symbol that has a RACH resource configured is the symbol 3, the terminal device may determine that the start moment of the first time window is the symbol 3.

A length of the first time window may be a fixed length, for example, seven symbols. Optionally, the length of the first time window may be configured by the network device, for example, three symbols or five symbols.

The network device may send length indication information to the terminal device, to indicate the length of the first time window. Optionally, the length of the first time window may be indicated by using a direct method. For example, if the length indication information is 5, the terminal device may determine that the length of the first time window is five symbols. Optionally, the length of the first time window may be described in a mapping manner. For example, a mapping relationship between the length indication information and the length of the first time window is shown in Table 1. It can be learned from Table 1 that when the length indication information is 00 in binary, the terminal device may determine that the length of the first time window is three symbols, and when the length indication information is 11 in binary, the terminal device may determine that the length of the first time window is seven symbols. It should be noted that the mapping relationship between the length indication information and the length of first time window in this embodiment of the present disclosure includes but is not limited to the foregoing manner, and research and development personnel may perform modification with reference to different scenarios. This is not specifically limited in this embodiment of the present disclosure.

The network device may configure the first time window for the terminal device by using signaling, for example, Radio Resource Control (RRC), a Media Access Control-control element (MAC-CE), or downlink control information (DCI).

The network device may send the length indication information to the terminal device, to notify the terminal device that the first time window is configured.

Step S502: The network device determines a beam failure recovery request first received in a second time window.

Specifically, the network device may receive, in the second time window in a receive RACH beam scanning manner, the beam failure recovery request sent by the terminal device, and determine the beam failure recovery request first received in the second time window.

The network device may configure the second time window on a network device side, and a beginning symbol included in the second time window may be the same as a beginning symbol included in a first unit time window.

A length of the second time window may be a fixed length, for example, four symbols. Optionally, the length of the second time window may be configured by the network device, for example, three symbols or five symbols.

Step S503: The network device sends a beam failure recovery request response to the terminal device in the second time window by using a beam corresponding to the determined beam failure recovery request.

During specific implementation, the network device may obtain a beam carrying the determined beam failure recovery request, determine the other beam included in a beam pair to which the beam belongs, and send the beam failure recovery request response to the terminal device in the second time window by using the determined beam. For example, the beam carrying the determined beam failure recovery request is a beam 1, the beam 1 and a beam 3 constitute a beam pair, and the network device may send the beam failure recovery request response to the terminal device in the second time window by using the beam 3.

In the example of the schematic diagram of information transmission shown in FIG. 4, the network device may send the beam failure recovery request response to the terminal device on a symbol 0 included in the second time window by using the other beam included in a beam pair to which the first beam belongs.

Optionally, the network device may send the beam failure recovery request response to the terminal device by using a PDCCH.

Optionally, the network device may send the beam failure recovery request response to the terminal device by using a MAC-CE.

Optionally, the network device may send the beam failure recovery request response to the terminal device by using RRC.

Optionally, the network device may send the beam failure recovery request response to the terminal device by using a PDSCH.

Step S504: The terminal device receives, on at least one symbol included in the first time window by using the first beam, the beam failure recovery request response sent by the network device.

The terminal device may receive, on the at least one symbol included in the first time window by using the first beam, the beam failure recovery request response sent by the network device. For example, if the terminal device sends the beam failure recovery request to the network device on at least one symbol included in the first time window by using the beam 1, the terminal device may receive, on at least one symbol included in the first time window by using the beam 1, the beam failure recovery request response sent by the network device.

Compared with a conventional beam recovery method in which at least two subframes are spaced between a receiving time when a terminal device receives a beam failure recovery request response and a sending time when the terminal device sends a beam failure recovery request, in this embodiment of the present disclosure, the first time window is spaced at most between a receiving time when the terminal device receives the beam failure recovery request response and a sending time when the terminal device sends the beam failure recovery request, for example, seven symbols, thereby reducing a delay and improving beam recovery efficiency.

In the method described in FIG. 5, the terminal device sends the beam failure recovery requests to the network device on the at least one symbol included in the first time window by using the at least one same first beam. The network device determines the beam failure recovery request first received in the second time window, and the network device sends the beam failure recovery request response to the terminal device in the second time window by using the beam corresponding to the determined beam failure recovery request. The terminal device receives, on the at least one symbol included in the first time window by using the first beam, the beam failure recovery request response sent by the network device, so that the network device can implement beam recovery processing on a plurality of beam failure recovery requests sent by a same terminal device, thereby improving beam recovery efficiency.

Figure 6:
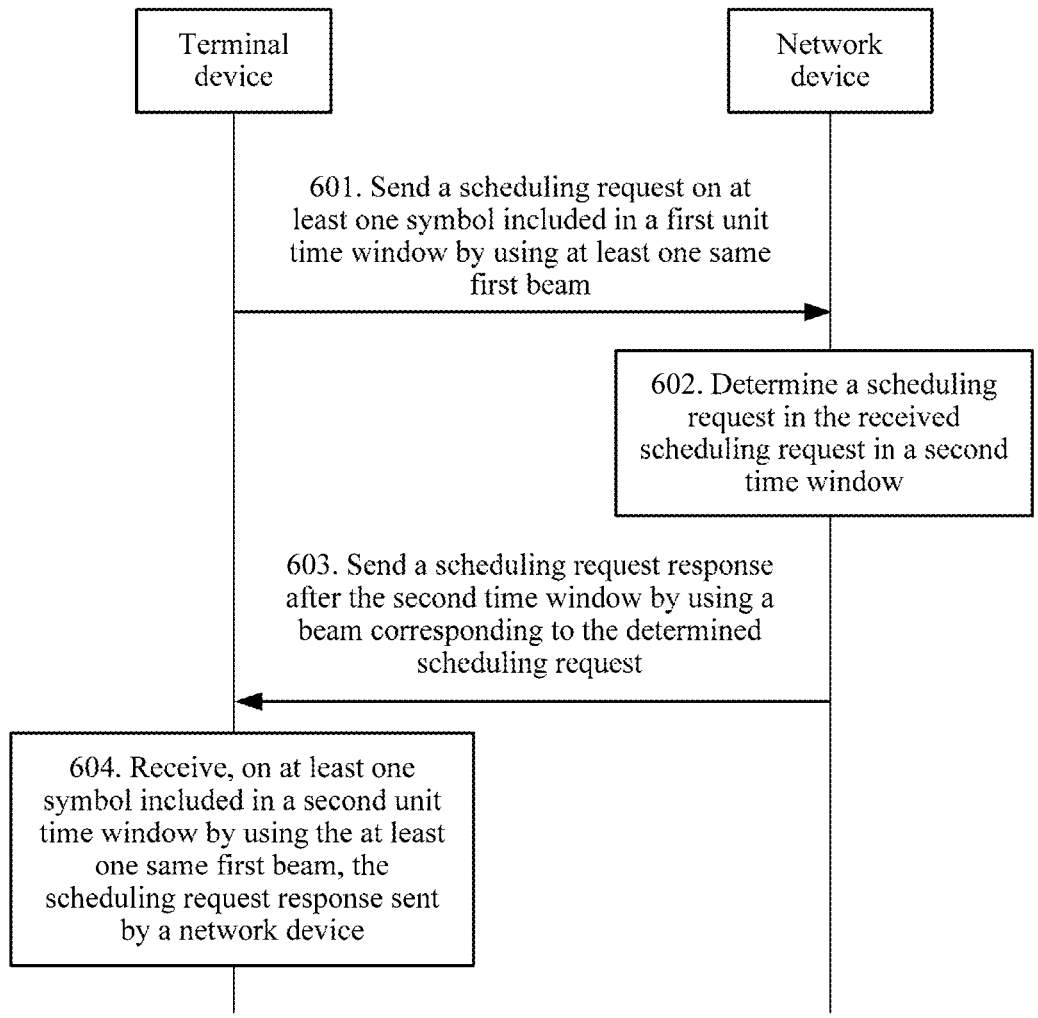
FIG. 6 is a schematic flowchart of a beam recovery method according to another embodiment of the present disclosure.

Based on the schematic architectural diagram of the beam recovery system shown in FIG. 1, FIG. 6 is a schematic flowchart of a beam recovery method according to an embodiment of the present disclosure. The method includes but is not limited to the following steps.

Step S601: A terminal device sends a scheduling request to a network device on at least one symbol included in a first unit time window by using at least one same first beam.

Specifically, when a DL beam fails, the terminal device may send the scheduling request to the network device on the at least one symbol included in the first unit time window by using the at least one same first beam. The first beam may be a beam configured by the network device for the terminal device, for example, a beam 1.

For example, the terminal device may select a symbol (for example, a symbol 3) in the first unit time window, and send the scheduling request to the network device on the symbol 3 by using one beam 1. For another example, the terminal device may select a symbol (for example, a symbol 3) in the first unit time window, and send the scheduling requests to the network device on the symbol 3 by using a plurality of beams 1, to be specific, the terminal device sends the scheduling requests to the network device on the symbol 3 by using the beams 1 in different directions. For another example, in an example of a schematic diagram of information transmission shown in FIG. 7, the terminal device may select a plurality of symbols (for example, a symbol 3 and a symbol 4) in the first unit time window, send the scheduling request to the network device on the symbol 3 by using one beam 1, and send the scheduling request to the network device on the symbol 4 by using the beam 1. For another example, the terminal device may select a plurality of symbols (for example, a symbol 3 and a symbol 4) in the first unit time window, send the scheduling requests to the network device on the symbol 3 by using a plurality of beams 1, and send the scheduling requests to the network device on the symbol 4 by using the plurality of beams 1.

In this embodiment of the present disclosure, the terminal device sends the scheduling requests to the network device on the at least one symbol included in the first unit time window by using a plurality of same first beams, so as to increase a subcarrier spacing.

In this embodiment of the present disclosure, the network device may configure the first unit time window for the terminal device. A start moment of the first unit time window may be the first symbol that has a RACH resource configured. In the example of the schematic diagram of information transmission shown in FIG. 7, if the first symbol that has a RACH resource configured is the symbol 3, the terminal device may determine that the start moment of the first unit time window is the symbol 3.

In this embodiment of the present disclosure, the network device may configure a second unit time window for the terminal device. A beginning symbol included in the second unit time window is a symbol immediately following a last symbol included in the first unit time window. In the example of the schematic diagram of information transmission shown in FIG. 7, if the last symbol included in the first unit time window is a symbol 6, the terminal device may determine that the beginning symbol included in the second unit time window is a symbol 0.

A length of the first unit time window may be a fixed length, for example, four symbols. Optionally, the length of the first unit time window may be configured by the network device, for example, three symbols or five symbols.

A length of the second unit time window may be a fixed length, for example, four symbols. Optionally, the length of the second unit time window may be configured by the network device, for example, three symbols or five symbols.

The network device may send first length indication information to the terminal device, to indicate the length of the first unit time window. Optionally, the length of the first unit time window may be indicated by using a direct method. Optionally, the length of the first unit time window may be described in a mapping manner.

The network device may send second length indication information to the terminal device, to indicate the length of the second unit time window. Optionally, the length of the second unit time window may be indicated by using a direct method. Optionally, the length of the second unit time window may be described in a mapping manner.

The network device may configure the first unit time window for the terminal device by using signaling, for example, RRC, a MAC-CE, or DCI.

The network device may configure the second unit time window for the terminal device by using signaling, for example, RRC, a MAC-CE, or DCI.

The network device may send the first length indication information to the terminal device, to notify the terminal device that the first unit time window is configured.

The network device may send the second length indication information to the terminal device, to notify the terminal device that the second unit time window is configured.

Step S602: The network device determines a scheduling request in the received scheduling request in a second time window.

Specifically, the network device may receive, in the second time window in a receive RACH beam scanning manner, the scheduling request sent by the terminal device, and determine the scheduling request in the received scheduling request.

Optionally, the network device may determine a scheduling request first received in the second time window.

Optionally, the network device may determine a scheduling request received in the second time window and carried on a beam whose quality is greater than a preset quality threshold.

Optionally, the network device may determine a scheduling request received in the second time window and carried on a beam whose quality is best.

The network device may configure the second time window on a network device side, and a beginning symbol included in the second time window may be the same as a beginning symbol included in the first unit time window.

A length of the second time window may be a fixed length, for example, four symbols. Optionally, the length of the second time window may be configured by the network device, for example, three symbols or five symbols.

Step S603: The network device sends a scheduling request response to the terminal device after the second time window by using a beam corresponding to the determined scheduling request.

During specific implementation, the network device may obtain a beam carrying the determined scheduling request, determine the other beam included in a beam pair to which the beam belongs, and send the scheduling request response to the terminal device after the second time window by using the determined beam. For example, the beam carrying the determined scheduling request is a beam 1, the beam 1 and a beam 3 constitute a beam pair, and the network device may send the scheduling request response to the terminal device after the second time window by using the beam 3.

Figure 7:
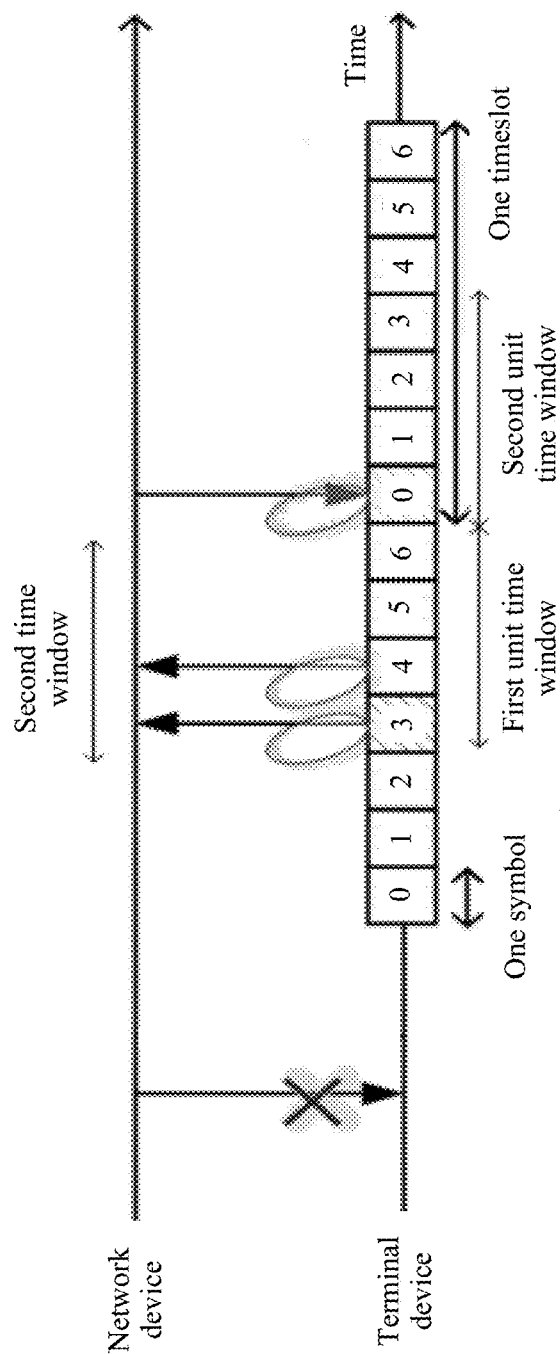
FIG. 7 is a schematic diagram of information transmission according to another embodiment of the present disclosure.

In the example of the schematic diagram of information transmission shown in FIG. 7, the network device may send the scheduling request response to the terminal device on a symbol immediately following the second time window, namely, on a symbol 0, by using the other beam included in a beam pair to which the first beam belongs.

Optionally, the network device may send the scheduling request response to the terminal device by using a PDCCH.

Optionally, the network device may send the scheduling request response to the terminal device by using a MAC-CE.

Optionally, the network device may send the scheduling request response to the terminal device by using RRC.

Optionally, the network device may send the scheduling request response to the terminal device by using a PDSCH.

Step S604: The terminal device receives, on at least one symbol included in a second unit time window by using the at least one same first beam, the scheduling request response sent by the network device.

The terminal device may receive, on the at least one symbol included in the second unit time window by using the at least one same first beam, the scheduling request response sent by the network device. For example, if the terminal device sends the scheduling request to the network device on at least one symbol included in the first unit time window by using the beam 1, the terminal device may receive, on at least one symbol included in the second unit time window by using the beam 1, the scheduling request response sent by the network device.

Compared with a conventional beam recovery method in which at least two subframes are spaced between a receiving time when a terminal device receives a scheduling request response and a sending time when the terminal device sends a scheduling request, in this embodiment of the present disclosure, the first time window is spaced at most between a receiving time when the terminal device receives the scheduling request response and a sending time when the terminal device sends the scheduling request, for example, seven symbols, thereby reducing a delay and improving beam recovery efficiency.

In the method described in FIG. 6, the terminal device sends the scheduling request to the network device on the at least one symbol included in the first time window by using the at least one same first beam. The network device determines the scheduling request first received in the second time window, and the network device sends the scheduling request response to the terminal device in the second time window by using the beam corresponding to the determined scheduling request. The terminal device receives, on the at least one symbol included in the second time window by using the first beam, the scheduling request response sent by the network device, so that the network device can implement beam recovery processing on a plurality of scheduling requests sent by a same terminal device, thereby improving beam recovery efficiency.

Figure 8:
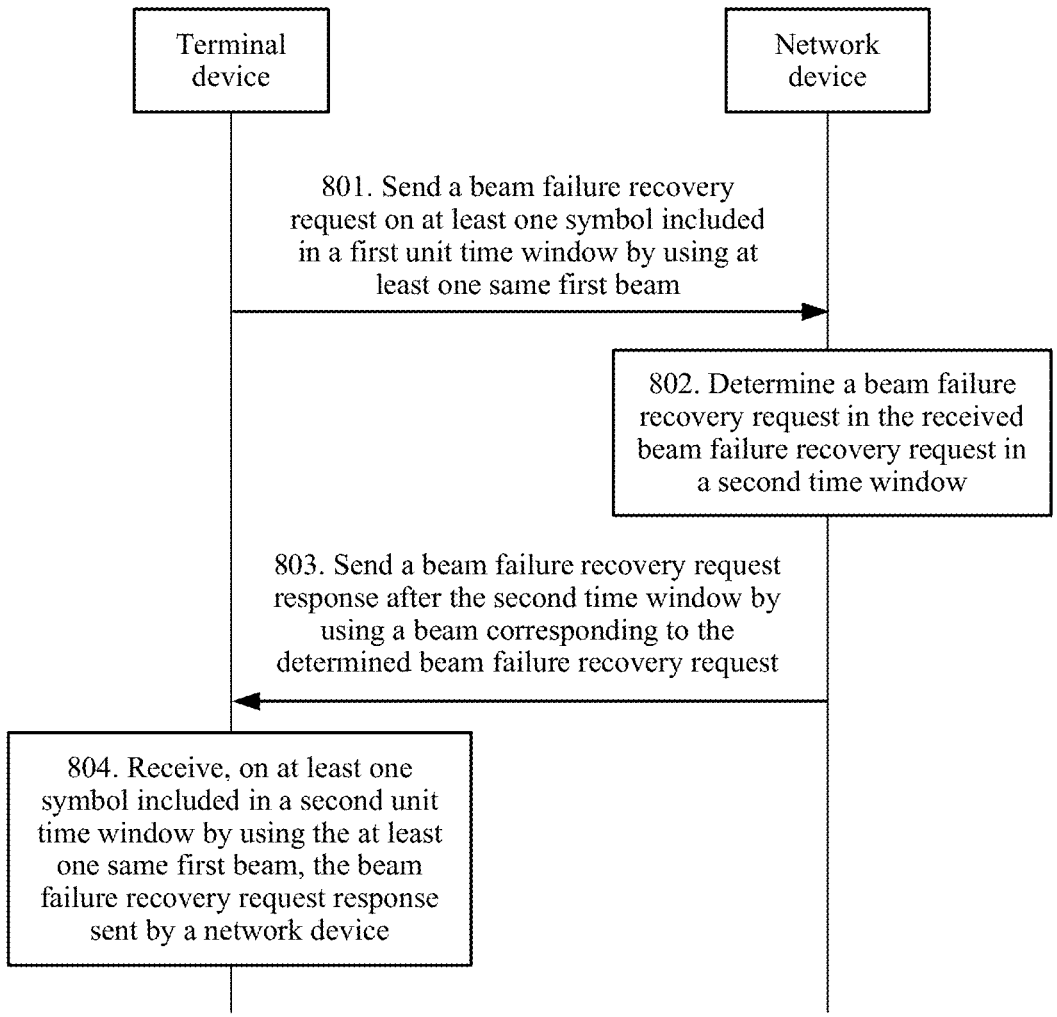
FIG. 8 is a schematic flowchart of a beam recovery method according to another embodiment of the present disclosure.

Based on the schematic architectural diagram of the beam recovery system shown in FIG. 1, FIG. 8 is a schematic flowchart of a beam recovery method according to an embodiment of the present disclosure. The method includes but is not limited to the following steps.

Step S801: A terminal device sends a beam failure recovery request to a network device on at least one symbol included in a first unit time window by using at least one same first beam.

Specifically, when a DL beam fails, the terminal device may send the beam failure recovery request to the network device on the at least one symbol included in the first unit time window by using the at least one same first beam. The first beam may be a beam configured by the network device for the terminal device, for example, a beam 1.

For example, the terminal device may select a symbol (for example, a symbol 3) in the first unit time window, and send the beam failure recovery request to the network device on the symbol 3 by using one beam 1. For another example, the terminal device may select a symbol (for example, a symbol 3) in the first unit time window, and send the beam failure recovery requests to the network device on the symbol 3 by using a plurality of beams 1, to be specific, the terminal device sends the beam failure recovery requests to the network device on the symbol 3 by using the beams 1 in different directions. For another example, in the example of the schematic diagram of information transmission shown in FIG. 7, the terminal device may select a plurality of symbols (for example, a symbol 3 and a symbol 4) in the first unit time window, send the beam failure recovery request to the network device on the symbol 3 by using one beam 1, and send the beam failure recovery request to the network device on the symbol 4 by using the beam 1. For another example, the terminal device may select a plurality of symbols (for example, a symbol 3 and a symbol 4) in the first unit time window, send the beam failure recovery requests to the network device on the symbol 3 by using a plurality of beams 1, and send the beam failure recovery requests to the network device on the symbol 4 by using the plurality of beams 1.

In this embodiment of the present disclosure, the terminal device sends the beam failure recovery requests to the network device on the at least one symbol included in the first unit time window by using a plurality of same first beams, so as to increase a subcarrier spacing.

In this embodiment of the present disclosure, the network device may configure the first unit time window for the terminal device. A start moment of the first unit time window may be the first symbol that has a RACH resource configured. In the example of the schematic diagram of information transmission shown in FIG. 7, if the first symbol that has a RACH resource configured is the symbol 3, the terminal device may determine that the start moment of the first unit time window is the symbol 3.

In this embodiment of the present disclosure, the network device may configure a second unit time window for the terminal device. A beginning symbol included in the second unit time window is a symbol immediately following a last symbol included in the first unit time window. In the example of the schematic diagram of information transmission shown in FIG. 7, if the last symbol included in the first unit time window is a symbol 8, the terminal device may determine that the beginning symbol included in the second unit time window is a symbol 0.

A length of the first unit time window may be a fixed length, for example, four symbols. Optionally, the length of the first unit time window may be configured by the network device, for example, three symbols or five symbols.

A length of the second unit time window may be a fixed length, for example, four symbols. Optionally, the length of the second unit time window may be configured by the network device, for example, three symbols or five symbols.

The network device may send first length indication information to the terminal device, to indicate the length of the first unit time window. Optionally, the length of the first unit time window may be indicated by using a direct method. Optionally, the length of the first unit time window may be described in a mapping manner.

The network device may send second length indication information to the terminal device, to indicate the length of the second unit time window. Optionally, the length of the second unit time window may be indicated by using a direct method. Optionally, the length of the second unit time window may be described in a mapping manner.

The network device may configure the first unit time window for the terminal device by using signaling, for example, RRC, a MAC-CE, or DCI.

The network device may configure the second unit time window for the terminal device by using signaling, for example, RRC, a MAC-CE, or DCI.

The network device may send the first length indication information to the terminal device, to notify the terminal device that the first unit time window is configured.

The network device may send the second length indication information to the terminal device, to notify the terminal device that the second unit time window is configured.

Step S802: The network device determines a beam failure recovery request in the received beam failure recovery request in a second time window.

Specifically, the network device may receive, in the second time window in a receive RACH beam scanning manner, the beam failure recovery request sent by the terminal device, and determine a beam failure recovery request in the received beam failure recovery request.

Optionally, the network device may determine a beam failure recovery request first received in the second time window.

Optionally, the network device may determine a beam failure recovery request received in the second time window and carried on a beam whose quality is greater than a preset quality threshold.

Optionally, the network device may determine a beam failure recovery request received in the second time window and carried on a beam whose quality is best.

The network device may configure the second time window on a network device side, and a beginning symbol included in the second time window may be the same as a beginning symbol included in the first time window.

A length of the second time window may be a fixed length, for example, four symbols. Optionally, the length of the second time window may be configured by the network device, for example, three symbols or five symbols.

Step S803: The network device sends a beam failure recovery request response to the terminal device after the second time window by using a beam corresponding to the determined beam failure recovery request.

During specific implementation, the network device may obtain a beam carrying the determined beam failure recovery request, determine the other beam included in a beam pair to which the beam belongs, and send the beam failure recovery request response to the terminal device after the second time window by using the determined beam. For example, the beam carrying the determined beam failure recovery request is a beam 1, the beam 1 and a beam 3 constitute a beam pair, and the network device may send the beam failure recovery request response to the terminal device after the second time window by using the beam 3.

In the example of the schematic diagram of information transmission shown in FIG. 7, the network device may send the beam failure recovery request response to the terminal device on a symbol immediately following the second time window by using the other beam included in a beam pair to which the first beam belongs.

Optionally, the network device may send the beam failure recovery request response to the terminal device by using a PDCCH.

Optionally, the network device may send the beam failure recovery request response to the terminal device by using a MAC-CE.

Optionally, the network device may send the beam failure recovery request response to the terminal device by using RRC.

Optionally, the network device may send the beam failure recovery request response to the terminal device by using a PDSCH.

Step S804: The terminal device receives, on at least one symbol included in a second unit time window by using the at least one same first beam, the beam failure recovery request response sent by the network device.

The terminal device may receive, on the at least one symbol included in the second unit time window by using the at least one same first beam, the beam failure recovery request response sent by the network device. For example, if the terminal device sends the beam failure recovery request to the network device on at least one symbol included in the first unit time window by using the beam 1, the terminal device may receive, on at least one symbol included in the second unit time window by using the beam 1, the beam failure recovery request response sent by the network device.

Compared with a conventional beam recovery method in which at least two subframes are spaced between a receiving time when a terminal device receives a beam failure recovery request response and a sending time when the terminal device sends a beam failure recovery request, in this embodiment of the present disclosure, the first time window is spaced at most between a receiving time when the terminal device receives the beam failure recovery request response and a sending time when the terminal device sends the beam failure recovery request, for example, seven symbols, thereby reducing a delay and improving beam recovery efficiency.

In the method described in FIG. 8, the terminal device sends the beam failure recovery request to the network device on the at least one symbol included in the first time window by using the at least one same first beam. The network device determines the beam failure recovery request first received in the second time window, and the network device sends the beam failure recovery request response to the terminal device in the second time window by using the beam corresponding to the determined beam failure recovery request. The terminal device receives, on the at least one symbol included in the second time window by using the first beam, the beam failure recovery request response sent by the network device, so that the network device can implement beam recovery processing on a plurality of beam failure recovery requests sent by a same terminal device, thereby improving beam recovery efficiency.

Figure 9:
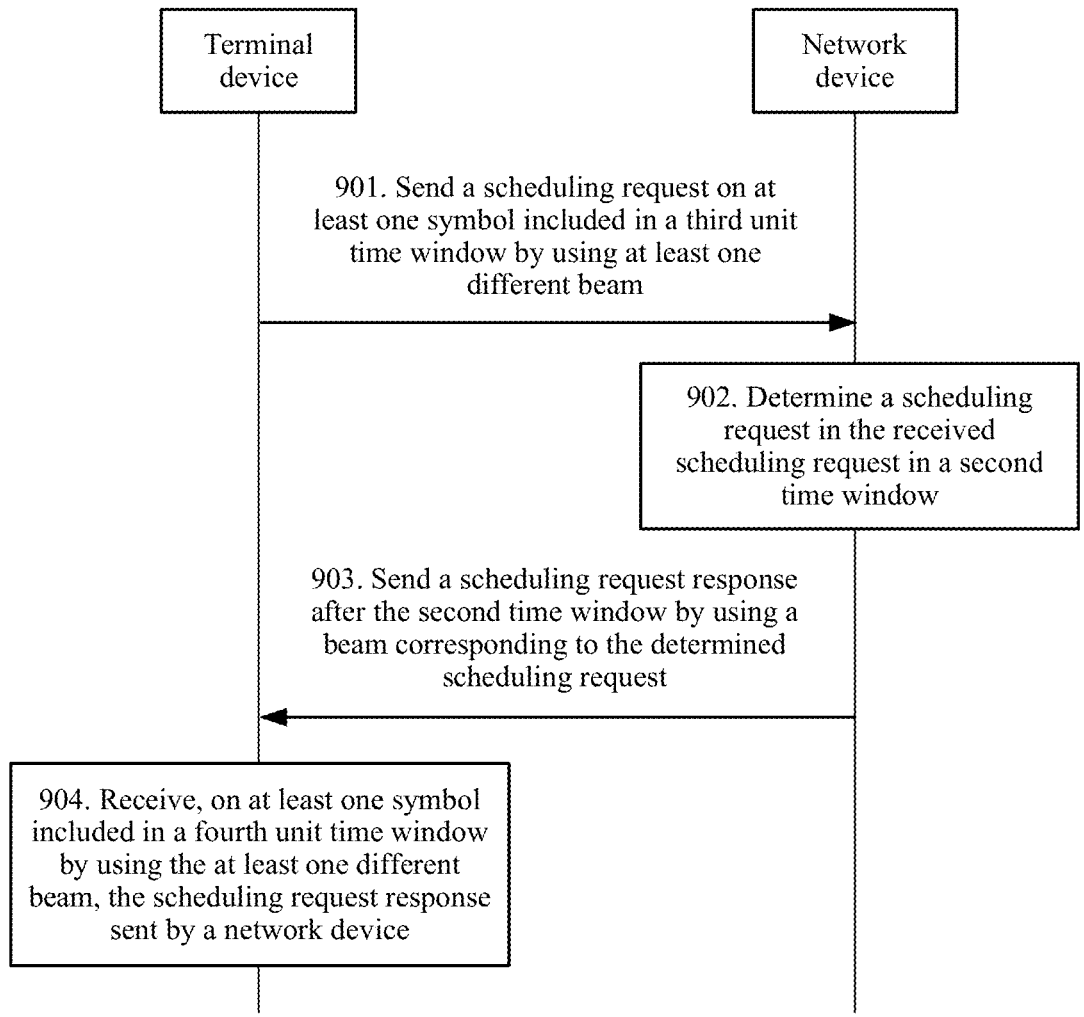
FIG. 9 is a schematic flowchart of a beam recovery method according to another embodiment of the present disclosure.

Based on the schematic architectural diagram of the beam recovery system shown in FIG. 1, FIG. 9 is a schematic flowchart of a beam recovery method according to an embodiment of the present disclosure. The method includes but is not limited to the following steps.

Step S901: A terminal device sends a scheduling request to a network device on at least one symbol included in a third unit time window by using at least one different beam.

Specifically, when a DL beam fails, the terminal device may send the scheduling request to the network device on the at least one symbol included in the third unit time window by using the at least one different beam. The network device may configure an allowed maximum quantity of beams for the terminal device, and the terminal device may send the scheduling request to the network device by using a quantity of beams that is less than or equal to the maximum quantity of beams.

For example, the terminal device may select a symbol (for example, a symbol 3) in the third unit time window, and send the scheduling request to the network device on the symbol 3 by using one beam 1. For another example, the terminal device may select a symbol (for example, a symbol 3) in the third unit time window, and send the scheduling requests to the network device on the symbol 3 by using a plurality of different beams. For example, the terminal device sends the scheduling requests to the network device on the symbol 3 by using a beam 1 and a beam 2. For another example, in an example of a schematic diagram of information transmission shown in FIG. 10, the terminal device may select a plurality of symbols (for example, a symbol 3 and a symbol 4) in the third unit time window, send the scheduling request to the network device on the symbol 3 by using one beam 1, and send the scheduling request to the network device on the symbol 4 by using the beam 1. For another example, the terminal device may select a plurality of symbols (for example, a symbol 3 and a symbol 4) in the third unit time window, send the scheduling requests to the network device on the symbol 3 by using a plurality of different beams, and send the scheduling requests to the network device on the symbol 4 by using the plurality of different beams.

In this embodiment of the present disclosure, the terminal device sends the scheduling requests to the network device on the at least one symbol included in the third unit time window by using a plurality of different beams, so as to increase a subcarrier spacing.

In this embodiment of the present disclosure, the network device may configure the allowed maximum quantity of beams for the terminal device by using signaling, for example, RRC, a MAC-CE, or DCI. A same maximum quantity of beams may be configured for all terminal devices in a same cell, or a same maximum quantity of beams may be configured for all terminal devices included in a terminal device cluster, or different maximum quantities of beams may be configured for different terminal devices. When the different maximum quantities of beams are configured for the different terminal devices, the terminal devices need to report capabilities of the terminal devices to the network device. The maximum quantity of beams may be indicated by using a direct method. Optionally, the maximum quantity of beams may be described by using a mapping method.

In this embodiment of the present disclosure, the network device may configure the third unit time window for the terminal device. A start moment of the third unit time window may be the first symbol that has a RACH resource configured. In the example of the schematic diagram of information transmission shown in FIG. 10, if the first symbol that has a RACH resource configured is the symbol 3, the terminal device may determine that the start moment of the third unit time window is the symbol 3.

In this embodiment of the present disclosure, the network device may configure a fourth unit time window for the terminal device. A beginning symbol included in the fourth unit time window is a symbol immediately following a last symbol included in the third unit time window. In the example of the schematic diagram of information transmission shown in FIG. 10, if the last symbol included in the third unit time window is a symbol 6, the terminal device may determine that the beginning symbol included in the fourth unit time window is a symbol 0.

A length of the third unit time window may be a fixed length, for example, four symbols. Optionally, the length of the third unit time window may be configured by the network device, for example, three symbols or five symbols.

A length of the fourth unit time window may be a fixed length, for example, four symbols. Optionally, the length of the fourth unit time window may be configured by the network device, for example, three symbols or five symbols.

The network device may send third length indication information to the terminal device, to indicate the length of the third unit time window. Optionally, the length of the third unit time window may be indicated by using a direct method. Optionally, the length of the third unit time window may be described in a mapping manner.

The network device may send fourth length indication information to the terminal device, to indicate the length of the fourth unit time window. Optionally, the length of the fourth unit time window may be indicated by using a direct method. Optionally, the length of the fourth unit time window may be described in a mapping manner.

The network device may configure the third unit time window for the terminal device by using signaling, for example, RRC, a MAC-CE, or DCI.

The network device may configure the fourth unit time window for the terminal device by using signaling, for example, RRC, a MAC-CE, or DCI.

The network device may send the third length indication information to the terminal device, to notify the terminal device that the third unit time window is configured.

The network device may send the fourth length indication information to the terminal device, to notify the terminal device that the fourth unit time window is configured.

Step S902: The network device determines a scheduling request in the received scheduling request in a second time window.

Specifically, the network device may receive, in the second time window in a receive RACH beam scanning manner, the scheduling request sent by the terminal device, and determine the scheduling request in the received scheduling request.

Optionally, the network device may determine a scheduling request first received in the second time window.

Optionally, the network device may determine a scheduling request received in the second time window and carried on a beam whose quality is greater than a preset quality threshold.

Optionally, the network device may determine a scheduling request received in the second time window and carried on a beam whose quality is best.

The network device may configure the second time window on a network device side, and a beginning symbol included in the second time window may be the same as a beginning symbol included in the third unit time window.

A length of the second time window may be a fixed length, for example, four symbols. Optionally, the length of the second time window may be configured by the network device, for example, three symbols or five symbols.

Step S903: The network device sends a scheduling request response to the terminal device after the second time window by using a beam corresponding to the determined scheduling request.

During specific implementation, the network device may obtain a beam carrying the determined scheduling request, determine the other beam included in a beam pair to which the beam belongs, and send the scheduling request response to the terminal device after the second time window by using the determined beam. For example, the beam carrying the determined scheduling request is a beam 1, the beam 1 and a beam 3 constitute a beam pair, and the network device may send the scheduling request response to the terminal device after the second time window by using the beam 3.

Figure 10:
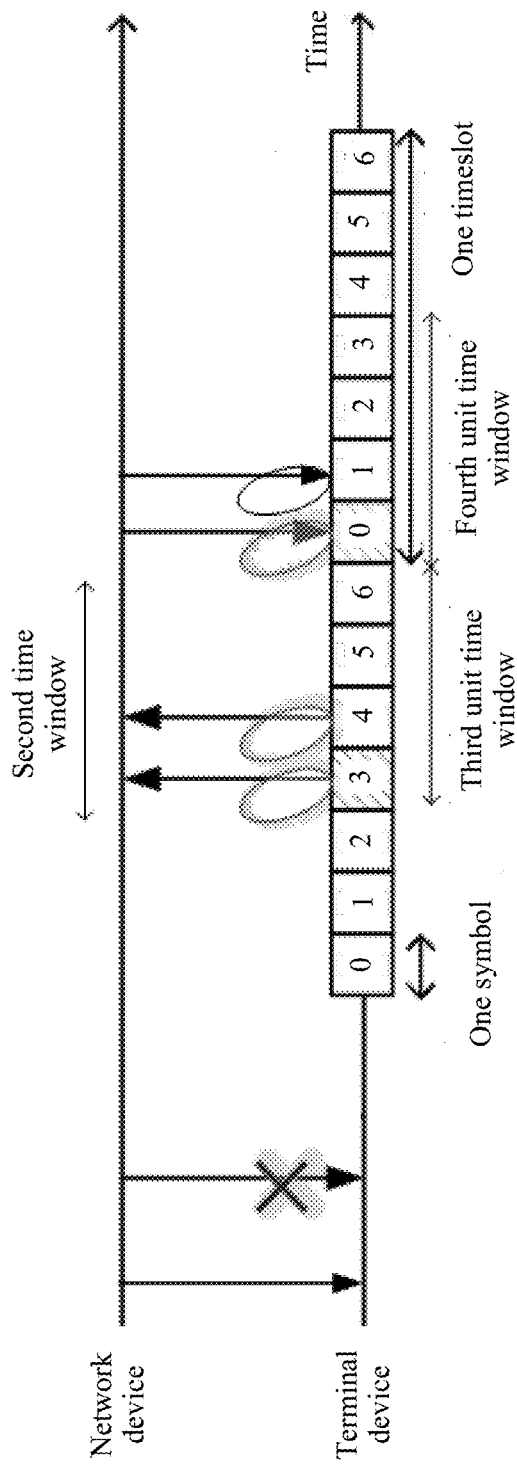
FIG. 10 is a schematic diagram of information transmission according to another embodiment of the present disclosure.

In the example of the schematic diagram of information transmission shown in FIG. 10, the network device may send the scheduling request response to the terminal device on a symbol immediately following the second time window, namely, on a symbol 0, by using the other beam included in a beam pair to which the first beam belongs. The network device may further send the scheduling request response to the terminal device on the second symbol following the second time window, namely, on a symbol 1, by using the other beam included in the beam pair to which the first beam belongs.

Optionally, the network device may send the scheduling request response to the terminal device by using a PDCCH.

Optionally, the network device may send the scheduling request response to the terminal device by using a MAC-CE.

Optionally, the network device may send the scheduling request response to the terminal device by using RRC.

Optionally, the network device may send the scheduling request response to the terminal device by using a PDSCH.

Step S904: The terminal device receives, on at least one symbol included in a fourth unit time window by using the at least one different beam, the scheduling request response sent by the network device.

The terminal device may receive, on the at least one symbol included in the fourth unit time window by using the at least one different beam, the scheduling request response sent by the network device. For example, if the terminal device sends the scheduling requests to the network device on at least one symbol included in the third unit time window by using a beam 1 and a beam 2, the terminal device may receive, on at least one symbol included in the fourth unit time window by using the beam 1 and the beam 2, the scheduling request responses sent by the network device.

Compared with a conventional beam recovery method in which at least two subframes are spaced between a receiving time when a terminal device receives a scheduling request response and a sending time when the terminal device sends a scheduling request, in this embodiment of the present disclosure, the first time window is spaced at most between a receiving time when the terminal device receives the scheduling request response and a sending time when the terminal device sends the scheduling request, for example, seven symbols, thereby reducing a delay and improving beam recovery efficiency.

In the method described in FIG. 9, the terminal device sends the scheduling request to the network device on the at least one symbol included in the third unit time window by using the at least one different beam. The network device determines the scheduling request from the received scheduling request in the second time window, and the network device sends the scheduling request response to the terminal device after the second time window by using the beam corresponding to the determined scheduling request. The terminal device receives, on the at least one symbol included in the fourth unit time window by using the at least one different beam, the scheduling request response sent by the network device, so that the network device can implement beam recovery processing on a plurality of scheduling requests sent by a same terminal device, thereby improving beam recovery efficiency.

Figure 11:
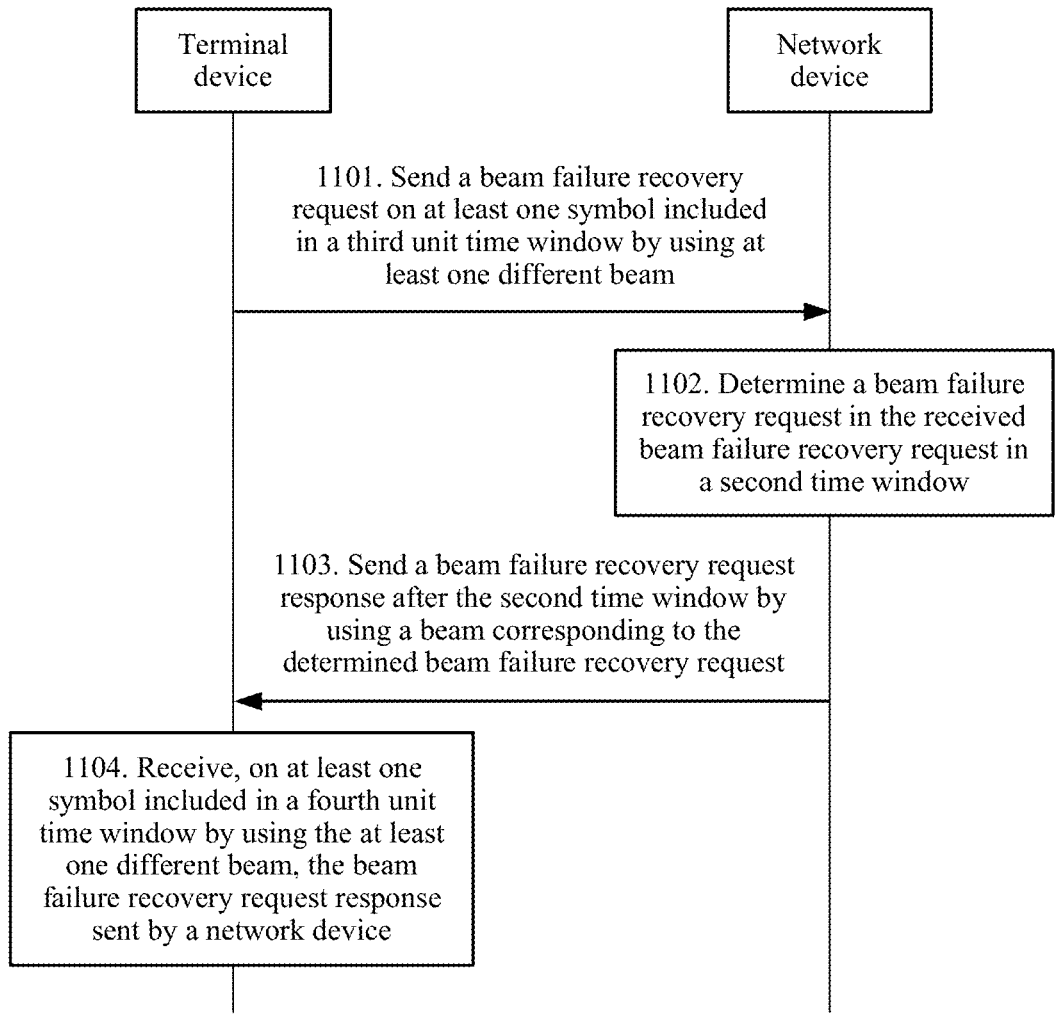
FIG. 11 is a schematic flowchart of a beam recovery method according to another embodiment of the present disclosure.

Based on the schematic architectural diagram of the beam recovery system shown in FIG. 1, FIG. 11 is a schematic flowchart of a beam recovery method according to an embodiment of the present disclosure. The method includes but is not limited to the following steps.

Step S1101: A terminal device sends a beam failure recovery request to a network device on at least one symbol included in a third unit time window by using at least one different beam.

Specifically, when a DL beam fails, the terminal device may send the beam failure recovery request to the network device on the at least one symbol included in the third unit time window by using the at least one different beam. The network device may configure an allowed maximum quantity of beams for the terminal device, and the terminal device may send the beam failure recovery request to the network device by using a quantity of beams that is less than or equal to the maximum quantity of beams.

For example, the terminal device may select a symbol (for example, a symbol 3) in the third unit time window, and send the beam failure recovery request to the network device on the symbol 3 by using one beam 1. For another example, the terminal device may select a symbol (for example, a symbol 3) in the third unit time window, and send the beam failure recovery requests to the network device on the symbol 3 by using a plurality of different beams. For example, the terminal device sends the beam failure recovery requests to the network device on the symbol 3 by using a beam 1 and a beam 2. For another example, in the example of the schematic diagram of information transmission shown in FIG. 10, the terminal device may select a plurality of symbols (for example, a symbol 3 and a symbol 4) in the third unit time window, send the beam failure recovery request to the network device on the symbol 3 by using one beam 1, and send the beam failure recovery request to the network device on the symbol 4 by using the beam 1. For another example, the terminal device may select a plurality of symbols (for example, a symbol 3 and a symbol 4) in the third unit time window, send the beam failure recovery requests to the network device on the symbol 3 by using a plurality of different beams, and send the beam failure recovery requests to the network device on the symbol 4 by using the plurality of different beams.

In this embodiment of the present disclosure, the terminal device sends the beam failure recovery requests to the network device on the at least one symbol included in the third unit time window by using a plurality of different beams, so as to increase a subcarrier spacing.

In this embodiment of the present disclosure, the network device may configure the allowed maximum quantity of beams for the terminal device by using signaling, for example, RRC, a MAC-CE, or DCI. A same maximum quantity of beams may be configured for all terminal devices in a same cell, or a same maximum quantity of beams may be configured for all terminal devices included in a terminal device cluster, or different maximum quantities of beams may be configured for different terminal devices. When the different maximum quantities of beams are configured for the different terminal devices, the terminal devices need to report capabilities of the terminal devices to the network device. The maximum quantity of beams may be indicated by using a direct method. Optionally, the maximum quantity of beams may be described by using a mapping method.

In this embodiment of the present disclosure, the network device may configure the third unit time window for the terminal device. A start moment of the third unit time window may be the first symbol that has a RACH resource configured. In the example of the schematic diagram of information transmission shown in FIG. 10, if the first symbol that has a RACH resource configured is the symbol 3, the terminal device may determine that the start moment of the third unit time window is the symbol 3.

In this embodiment of the present disclosure, the network device may configure a fourth unit time window for the terminal device. A beginning symbol included in the fourth unit time window is a symbol immediately following a last symbol included in the third unit time window. In the example of the schematic diagram of information transmission shown in FIG. 10, if the last symbol included in the third unit time window is a symbol 6, the terminal device may determine that the beginning symbol included in the fourth unit time window is a symbol 0.

A length of the third unit time window may be a fixed length, for example, four symbols. Optionally, the length of the third unit time window may be configured by the network device, for example, three symbols or five symbols.

A length of the fourth unit time window may be a fixed length, for example, four symbols. Optionally, the length of the fourth unit time window may be configured by the network device, for example, three symbols or four symbols.

The network device may send third length indication information to the terminal device, to indicate the length of the third unit time window. Optionally, the length of the third unit time window may be indicated by using a direct method. Optionally, the length of the third unit time window may be described in a mapping manner.

The network device may send fourth length indication information to the terminal device, to indicate the length of the fourth unit time window. Optionally, the length of the fourth unit time window may be indicated by using a direct method. Optionally, the length of the fourth unit time window may be described in a mapping manner.

The network device may configure the third unit time window for the terminal device by using signaling, for example, RRC, a MAC-CE, or DCI.

The network device may configure the fourth unit time window for the terminal device by using signaling, for example, RRC, a MAC-CE, or DCI.

The network device may send the third length indication information to the terminal device, to notify the terminal device that the third unit time window is configured.

The network device may send the fourth length indication information to the terminal device, to notify the terminal device that the fourth unit time window is configured.

Step S1102: The network device determines a beam failure recovery request in the received beam failure recovery request in a second time window.

Specifically, the network device may receive, in the second time window in a receive RACH beam scanning manner, the beam failure recovery request sent by the terminal device, and determine the beam failure recovery request in the received beam failure recovery request.

Optionally, the network device may determine a beam failure recovery request first received in the second time window.

Optionally, the network device may determine a beam failure recovery request received in the second time window and carried on a beam whose quality is greater than a preset quality threshold.

Optionally, the network device may determine a beam failure recovery request received in the second time window and carried on a beam whose quality is best.

The network device may configure the second time window on a network device side, and a beginning symbol included in the second time window may be the same as a beginning symbol included in the third unit time window.

A length of the second time window may be a fixed length, for example, four symbols. Optionally, the length of the second time window may be configured by the network device, for example, three symbols or five symbols.

Step S1103: The network device sends a beam failure recovery request response to the terminal device after the second time window by using a beam corresponding to the determined beam failure recovery request.

During specific implementation, the network device may obtain a beam carrying the determined beam failure recovery request, determine the other beam included in a beam pair to which the beam belongs, and send the beam failure recovery request response to the terminal device after the second time window by using the determined beam. For example, the beam carrying the determined beam failure recovery request is a beam 1, the beam 1 and a beam 3 constitute a beam pair, and the network device may send the beam failure recovery request response to the terminal device after the second time window by using the beam 3.

In the example of the schematic diagram of information transmission shown in FIG. 10, the network device may send the beam failure recovery request response to the terminal device on a symbol immediately following the second time window, namely, on a symbol 0, by using the other beam included in a beam pair to which the first beam belongs. The network device may further send the beam failure recovery request response to the terminal device on a second symbol following the second time window, namely, on a symbol 1, by using the other beam included in the beam pair to which the first beam belongs.

Optionally, the network device may send the beam failure recovery request response to the terminal device by using a PDCCH.

Optionally, the network device may send the beam failure recovery request response to the terminal device by using a MAC-CE.

Optionally, the network device may send the beam failure recovery request response to the terminal device by using RRC.

Optionally, the network device may send the beam failure recovery request response to the terminal device by using a PDSCH.

Step S1104: The terminal device receives, on at least one symbol included in a fourth unit time window by using the at least one different beam, the beam failure recovery request response sent by the network device.

The terminal device may receive, on the at least one symbol included in the fourth unit time window by using the at least one different beam, the beam failure recovery request response sent by the network device. For example, if the terminal device sends the beam failure recovery requests to the network device on at least one symbol included in the third unit time window by using a beam 1 and a beam 2, the terminal device may receive, on at least one symbol included in the fourth unit time window by using the beam 1 and the beam 2, the beam failure recovery request responses sent by the network device.

Compared with a conventional beam recovery method in which at least two subframes are spaced between a receiving time when a terminal device receives a beam failure recovery request response and a sending time when the terminal device sends a beam failure recovery request, in this embodiment of the present disclosure, the first time window is spaced at most between a receiving time when the terminal device receives the beam failure recovery request response and a sending time when the terminal device sends the beam failure recovery request, for example, seven symbols, thereby reducing a delay and improving beam recovery efficiency.

In the method described in FIG. 11, the terminal device sends the beam failure recovery request to the network device on the at least one symbol included in the third unit time window by using the at least one different beam. The network device determines the beam failure recovery request from the received beam failure recovery request in the second time window, and the network device sends the beam failure recovery request response to the terminal device after the second time window by using the beam corresponding to the determined beam failure recovery request. The terminal device receives, on the at least one symbol included in the fourth unit time window by using the at least one different beam, the beam failure recovery request response sent by the network device, so that the network device can implement beam recovery processing on a plurality of beam failure recovery requests sent by a same terminal device, thereby improving beam recovery efficiency.

The method in the embodiments of the present disclosure is described in detail above, and an apparatus in an embodiment of the present disclosure is provided below.

Figure 12:
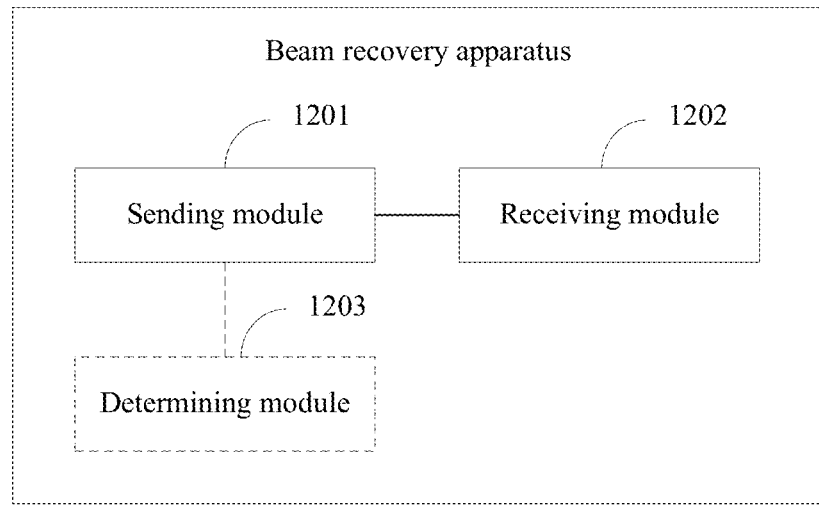
FIG. 12 is a schematic structural diagram of a beam recovery apparatus according to an embodiment of the present disclosure.

FIG. 12 is a schematic structural diagram of a beam recovery apparatus according to an embodiment of the present disclosure. The beam recovery apparatus may include a sending module 1201 and a receiving module 1202. Detailed descriptions of the modules are as follows:

The sending module 1201 is configured to send a beam recovery request to a network device in a first time window by using at least one beam, and the beam recovery request is a scheduling request or a beam failure recovery request.

The receiving module 1202 is configured to receive, in the first time window by using the at least one beam, a beam recovery request response sent by the network device, and the beam recovery request response is a scheduling request response or a beam failure recovery request response.

Optionally, the sending module 1201 is specifically configured to send the beam recovery request to the network device on at least one symbol included in the first time window by using at least one same first beam.

Optionally, the receiving module 1202 is specifically configured to receive the beam recovery request response on at least one symbol included in the first time window by using the first beam.

Optionally, the first time window includes a first unit time window and a second unit time window, and a beginning symbol included in the second unit time window is a symbol immediately following a last symbol included in the first unit time window.

The sending module 1201 is specifically configured to send the beam recovery request to the network device on at least one symbol included in the first unit time window by using at least one same first beam.

Optionally, the receiving module 1202 is specifically configured to receive the beam recovery request response on at least one symbol included in the second unit time window by using the first beam.

Optionally, the beam recovery apparatus in this embodiment of the present disclosure may further include:

a determining module 1203, configured to: when the beam recovery request response is not received in the first time window, determine a third time window configured by the network device for the beam recovery apparatus.

The sending module 1201 is further configured to send the beam recovery request to the network device on at least one symbol included in the third time window by using at least one same second beam.

Optionally, the first time window includes a third unit time window and a fourth unit time window, and a beginning symbol included in the fourth unit time window is a symbol immediately following a last symbol included in the third unit time window.

The sending module 1201 is specifically configured to send the beam recovery request to the network device on at least one symbol included in the third unit time window by using at least one different beam.

Optionally, the receiving module 1202 is specifically configured to receive the beam recovery request response on at least one symbol included in the fourth unit time window by using the at least one different beam.

Optionally, the sending module 1201 is specifically configured to send, based on beam request indication information configured by the network device for the terminal device, the beam recovery request to the network device in the first time window by using the at least one beam. The beam request indication information is used to indicate a sending manner of the beam recovery request.

Optionally, a beginning symbol included in the first time window is the first symbol that has a RACH resource configured.

Optionally, a length of the first time window is configured by the network device.

Optionally, a total quantity of symbols included in the first time window is determined based on a maximum quantity of beams that is configured by the network device for the beam recovery apparatus.

It should be noted that for details of this embodiment of the present disclosure, refer to related descriptions of the embodiments shown in FIG. 3, FIG. 5, FIG. 6, FIG. 8, FIG. 9, and FIG. 11. Details are not described again.

The beam recovery apparatus in this embodiment of the present disclosure fully corresponds to the terminal device in the method embodiment, and corresponding modules perform corresponding steps. For example, the sending module 1201 performs the sending step in the method embodiment, the receiving module 1202 performs the receiving step in the method embodiment, and steps other than the sending step and the receiving step may be performed by the determining module 1203 or a processor. For a function of a specific module, refer to a corresponding method embodiment. Details are not described again.

In the beam recovery apparatus described in FIG. 12, the sending module 1201 sends the beam recovery request to the network device in the first time window by using the at least one beam, and the receiving module 1202 receives, in the first time window by using the at least one beam, the beam recovery request response sent by the network device, so that the network device can implement beam recovery processing on a plurality of beam recovery requests sent by a same beam recovery apparatus, thereby improving beam recovery efficiency.

Figure 13:
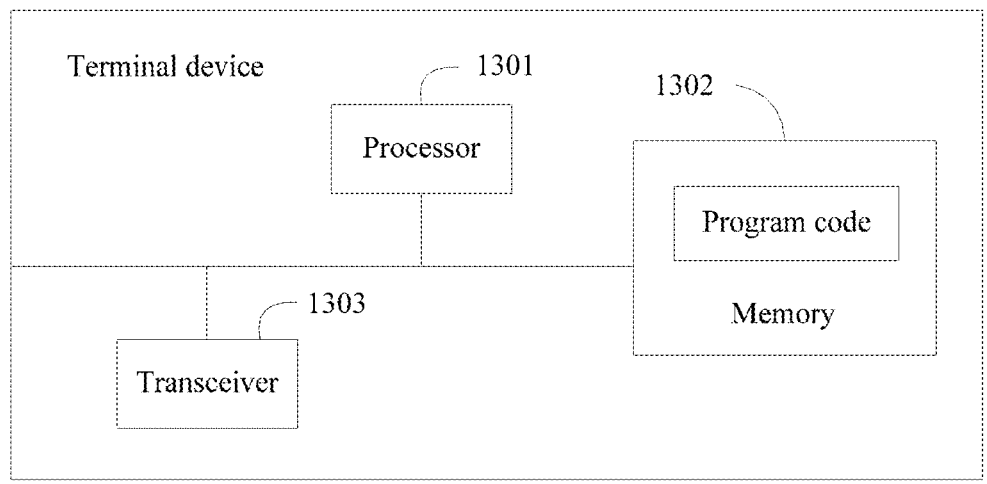
FIG. 13 is a schematic structural diagram of a terminal device according to an embodiment of the present disclosure.

FIG. 13 shows a terminal device according to an embodiment of the present disclosure. The terminal device includes a processor 1301, a memory 1302, and a transceiver 1303, and the processor 1301, the memory 1302, and the transceiver 1303 are connected to each other by using a bus.

The memory 1302 includes but is not limited to a random access memory (RAM), a read-only memory (ROM), an erasable programmable read-only memory (EPROM), or a compact disc read-only memory (CD-ROM). The memory 1302 is configured to store a related instruction and data such as a beam recovery request. The transceiver 1303 is configured to receive and send data, for example, send a beam recovery request to a network device by using at least one beam, or receive, by using at least one beam, a beam recovery request response sent by a network device. The memory 1302 may be an independent device, or may be integrated into the processor 1301.

The processor 1301 may be one or more central processing units (CPU) or one or more micro control units (MCU). When the processor 1301 is one CPU, the CPU may be a single-core CPU, or may be a multi-core CPU. The processor 1301 may be combined with the beam recovery apparatus shown in FIG. 12.

It should be understood that the transceiver 1303 may include a transmitter and a receiver. The transceiver 1303 may further include an antenna, and there may be one or more antennas.

All or some of the foregoing components may be integrated into a chip for implementation, for example, integrated into a baseband chip for implementation.

The processor 1301 in the terminal device is configured to read program code stored in the memory 1302, to perform the following operations:

sending, by using the transceiver 1303, a beam recovery request to the network device in a first time window by using at least one beam, where the beam recovery request is a scheduling request or a beam failure recovery request; and receiving, by using the transceiver 1303 and in the first time window by using the at least one beam, a beam recovery request response sent by the network device, where the beam recovery request response is a scheduling request response or a beam failure recovery request response.

Optionally, that the processor 1301 sends a beam recovery request to the network device in a first time window by using at least one beam may be specifically:

sending the beam recovery request to the network device on at least one symbol included in the first time window by using at least one same first beam.

Optionally, that the processor 1301 receives, in the first time window by using the at least one beam, a beam recovery request response sent by the network device may be specifically:

receiving the beam recovery request response on at least one symbol included in the first time window by using the first beam.

Optionally, the first time window includes a first unit time window and a second unit time window, and a beginning symbol included in the second unit time window is a symbol immediately following a last symbol included in the first unit time window.

That the processor 1301 sends a beam recovery request to the network device in a first time window by using at least one beam may be specifically:

sending the beam recovery request to the network device on at least one symbol included in the first unit time window by using at least one same first beam.

Optionally, that the processor 1301 receives, in the first time window by using the at least one beam, a beam recovery request response sent by the network device may be specifically:

receiving the beam recovery request response on at least one symbol included in the second unit time window by using the first beam.

Optionally, the processor 1301 may further perform the following operations:

when the beam recovery request response is not received in the first time window, determining a third time window configured by the network device for the terminal device; and sending the beam recovery request to the network device on at least one symbol included in the third time window by using at least one same second beam.

Optionally, the first time window includes a third unit time window and a fourth unit time window, and a beginning symbol included in the fourth unit time window is a symbol immediately following a last symbol included in the third unit time window.

That the processor 1301 sends a beam recovery request to the network device in a first time window by using at least one beam may be specifically:

sending the beam recovery request to the network device on at least one symbol included in the third unit time window by using at least one different beam.

Optionally, that the processor 1301 receives, in the first time window by using the at least one beam, a beam recovery request response sent by the network device may be specifically:

receiving the beam recovery request response on at least one symbol included in the fourth unit time window by using the at least one different beam.

Optionally, that the processor 1301 sends a beam recovery request to the network device in a first time window by using at least one beam may be specifically:

sending, based on beam request indication information configured by the network device for the terminal device, the beam recovery request to the network device in the first time window by using the at least one beam, where the beam request indication information is used to indicate a sending manner of the beam recovery request.

Optionally, a beginning symbol included in the first time window is the first symbol that has a RACH resource configured.

Optionally, a length of the first time window is configured by the network device.

Optionally, a total quantity of symbols included in the first time window is determined based on a maximum quantity of beams that is configured by the network device for the terminal device.

It should be noted that for details of this embodiment of the present disclosure, refer to related descriptions of the embodiments shown in FIG. 3, FIG. 5, FIG. 6, FIG. 8, FIG. 9, and FIG. 11. Details are not described again.

In the terminal device described in FIG. 13, the processor 1301 sends the beam recovery request to the network device in the first time window by using the at least one beam, and receives, in the first time window by using the at least one beam, the beam recovery request response sent by the network device, so that the network device can implement beam recovery processing on a plurality of beam recovery requests sent by a same terminal device, thereby improving beam recovery efficiency.

Figure 14:
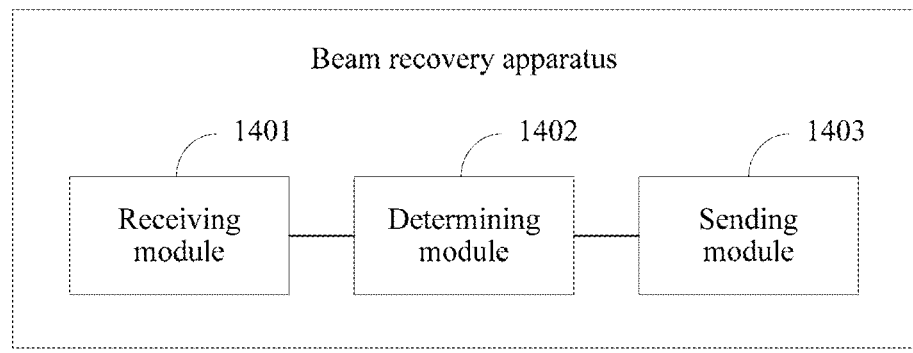
FIG. 14 is a schematic structural diagram of a beam recovery apparatus according to another embodiment of the present disclosure.

FIG. 14 is a schematic structural diagram of a beam recovery apparatus according to an embodiment of the present disclosure. The beam recovery apparatus may include a receiving module 1401, a determining module 1402, and a sending module 1403. Detailed descriptions of the modules are as follows:

The receiving module 1401 is configured to receive a beam recovery request sent by a terminal device in a first time window by using at least one beam, and the beam recovery request is a scheduling request or a beam failure recovery request.

The determining module 1402 is configured to determine a beam recovery request in the received beam recovery request in a second time window.

The sending module 1403 is configured to send a beam recovery request response to the terminal device by using a beam corresponding to the determined beam recovery request, and the beam recovery request response is a scheduling request response or a beam failure recovery request response.

Optionally, the determining module 1402 is specifically configured to respond to a beam recovery request received in the second time window and carried on a beam whose quality is best, and a beginning symbol included in the second time window is the same as a beginning symbol included in the first time window.

Optionally, the determining module 1402 is specifically configured to respond to a beam recovery request first received in the second time window.

Optionally, the sending module 1403 is specifically configured to send the beam recovery request response to the terminal device in the second time window by using the beam corresponding to the determined beam recovery request.

Optionally, the sending module 1403 is specifically configured to send the beam recovery request response to the terminal device beyond the second time window by using the beam corresponding to the determined beam recovery request.

It should be noted that for details of this embodiment of the present disclosure, refer to related descriptions of the embodiments shown in FIG. 3, FIG. 5, FIG. 6, FIG. 8, FIG. 9, and FIG. 11. Details are not described again.

The beam recovery apparatus in this embodiment of the present disclosure fully corresponds to the terminal device in the method embodiment, and corresponding modules perform corresponding steps. For example, the sending module 1403 performs the sending step in the method embodiment, the receiving module 1401 performs the receiving step in the method embodiment, and steps other than the sending step and the receiving step may be performed by the determining module 1402 or a processor. For a function of a specific module, refer to a corresponding method embodiment. Details are not described again.

In the beam recovery apparatus described in FIG. 14, the receiving module 1401 receives the beam recovery request sent by the terminal device in the first time window by using the at least one beam, the determining module 1402 determines the beam recovery request in the received beam recovery request in the second time window, and the sending module 1403 sends the beam recovery request response to the terminal device by using the beam corresponding to the determined beam recovery request, so that the network device can implement beam recovery processing on a plurality of beam recovery requests sent by a same beam recovery apparatus, thereby improving beam recovery efficiency.

Figure 15:
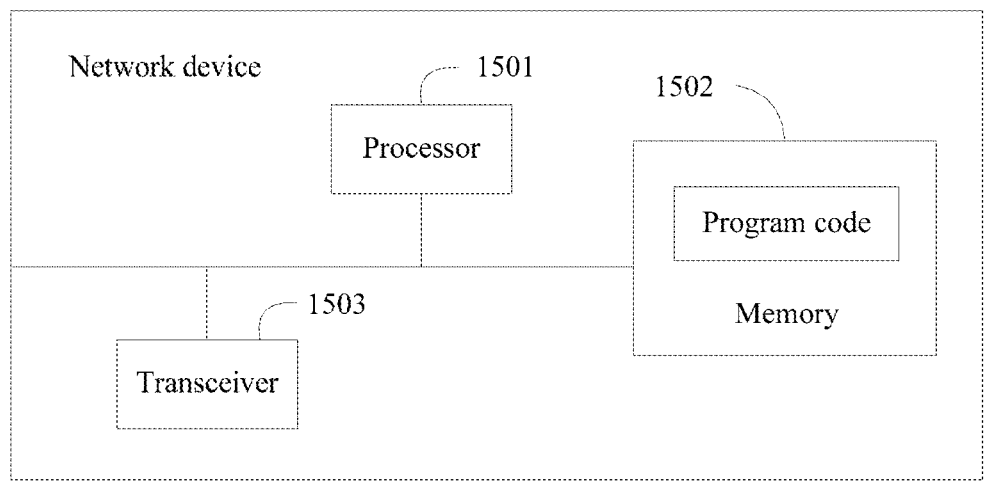
FIG. 15 is a schematic structural diagram of a network device according to an embodiment of the present disclosure.

FIG. 15 shows a network device according to an embodiment of the present disclosure. The network device includes a processor 1501, a memory 1502, and a transceiver 1503, and the processor 1501, the memory 1502, and the transceiver 1503 are connected to each other by using a bus.

The memory 1502 includes but is not limited to a RAM, a ROM, an EPROM, or a CD-ROM, and the memory 1502 is configured to store a related instruction and data, for example, a beam recovery request. The transceiver 1503 is configured to receive and send data, for example, receive a beam recovery request sent by a terminal device by using at least one beam, or send a beam recovery request response to a terminal device by using a beam corresponding to a determined beam recovery request. The memory 1502 may be an independent device, or may be integrated into the processor 1501.

The processor 1501 may be one or more CPUs or one or more MCUs. When the processor 1501 is one CPU, the CPU may be a single-core CPU, or may be a multi-core CPU. The processor 1501 may be combined with the beam recovery apparatus shown in FIG. 14.

It should be understood that the transceiver 1503 may include a transmitter and a receiver. The transceiver 1503 may further include an antenna, and there may be one or more antennas.

The processor 1501 in the network device is configured to read program code stored in the memory 1502, to perform the following operations:

receiving, by using the transceiver 1503, a beam recovery request sent by a terminal device in a first time window by using at least one beam, where the beam recovery request is a scheduling request or a beam failure recovery request;

determining a beam recovery request in the received beam recovery request in a second time window; and sending, by using the transceiver 1503, a beam recovery request response to the terminal device by using a beam corresponding to the determined beam recovery request, where the beam recovery request response is a scheduling request response or a beam failure recovery request response.

Optionally, that the processor 1501 determines a beam recovery request in the received beam recovery request may be specifically:

responding to a beam recovery request received in the second time window and carried on a beam whose quality is best, where a beginning symbol included in the second time window is the same as a beginning symbol included in the first time window.

Optionally, that the processor 1501 determines a beam recovery request in the received beam recovery request may be specifically:

responding to a beam recovery request first received in the second time window.

Optionally, that the processor 1501 sends a beam recovery request response to the terminal device by using a beam corresponding to the determined beam recovery request may be specifically:

sending the beam recovery request response to the terminal device in the second time window by using the beam corresponding to the determined beam recovery request.

Optionally, that the processor 1501 sends a beam recovery request response to the terminal device by using a beam corresponding to the determined beam recovery request may be specifically:

sending the beam recovery request response to the terminal device beyond the second time window by using the beam corresponding to the determined beam recovery request.

In the network device described in FIG. 15, the processor 1501 receives the beam recovery request sent by the terminal device in the first time window by using at least one beam, determines the beam recovery request in the received beam recovery request in the second time window, and sends the beam recovery request response to the terminal device by using the beam corresponding to the determined beam recovery request, so that the network device can implement beam recovery processing on a plurality of beam recovery requests sent by a same terminal device, thereby improving beam recovery efficiency.

Figure 16:
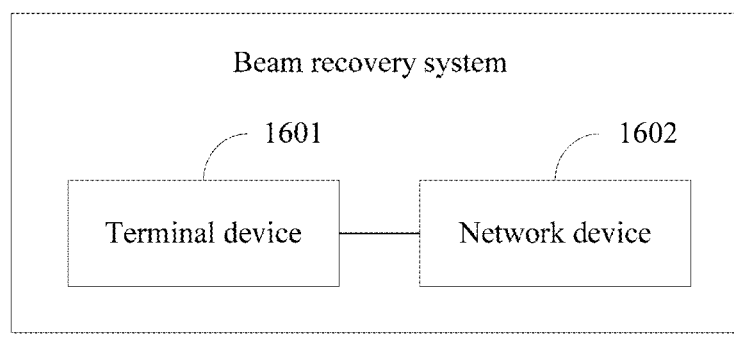
FIG. 16 is a schematic structural diagram of a beam recovery system according to an embodiment of the present disclosure.

FIG. 16 shows a beam recovery system according to an embodiment of the present disclosure. The beam recovery system may include a terminal device 1601 shown in FIG. 13 and a network device 1602 shown in FIG. 15. For details, refer to descriptions in FIG. 13 and FIG. 15. Details are not described in this embodiment of the present disclosure again.

An embodiment of this application further provides a communications chip. The communications chip stores an instruction, and when being run on the terminal device 1601, the instruction enables the communications chip to perform the method corresponding to the terminal device in various implementations in FIG. 13.

An embodiment of this application further provides a communications chip. The communications chip stores an instruction, and when being run on the network device 1602, the instruction enables the communications chip to perform the method corresponding to the terminal device in various implementations in FIG. 15.

The network device and the terminal device in the foregoing solutions have functions of implementing corresponding steps performed by the network device and the terminal device in the foregoing methods, and the functions may be implemented by hardware, or may be implemented by executing corresponding software by hardware. The hardware or the software includes one or more modules corresponding to the foregoing functions. For example, a sending module may be replaced with a transmitter, a receiving module may be replaced with a receiver, and another module such as a processing module may be replaced with a processor, so as to respectively perform a sending operation, a receiving operation, and a related processing operation in each method embodiment.

A person of ordinary skill in the art may understand that all or some of the processes of the methods in the embodiments may be implemented by a computer program instructing relevant hardware. The program may be stored in a computer readable storage medium. When the program is executed, the processes of the methods in the embodiments are performed. The foregoing storage medium includes: any medium that can store program code, such as a ROM, a random access memory RAM, a magnetic disk, or an optical disc.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

What is claimed is:

1. A beam recovery method, wherein the method comprises:
   sending, by a terminal device, capability of the terminal device to a network device, wherein the capability of the terminal device includes a finite quantity of beams supported by the terminal device for sending beam recovery request;
   receiving, by the terminal device, a beam quantity configured by the network device based on the finite quantity of beams from the network device;
   sending, by the terminal device, a plurality of beam recovery requests to the network device in a first time window using at least one beam, wherein the beam recovery request is a scheduling request or a beam failure recovery request, a quantity of the at least one beam is less than or equal to the beam quantity configured by the network device based on the finite quantity of beams; and
   receiving, by the terminal device in the first time window using the at least one beam, a beam recovery request response sent by the network device, wherein the beam recovery request response is a scheduling request response or a beam failure recovery request response;
   wherein the first time window comprises a first unit time window and a second unit time window, and a beginning symbol comprised in the second unit time window is a symbol immediately following a last symbol comprised in the first unit time window; and
   the sending, by the terminal device, a plurality of beam recovery requests to the network device in a first time window using at least one beam comprises:
   sending, by the terminal device, the plurality of beam recovery requests to the network device on at least one symbol comprised in the first unit time window using at least one same first beam; and
   wherein the receiving, by the terminal device in the first time window using the at least one beam, a beam recovery request response sent by the network device comprises:
   receiving, by the terminal device, the beam recovery request response on at least one symbol comprised in the second unit time window using the at least one same first beam.

2. The method according to claim 1, wherein the plurality of beam recovery requests are sent using a random access channel (RACH) resource.

3. The method according to claim 1, wherein the beam recovery request response is sent using a physical downlink control channel (PDCCH), and a cyclic redundancy check (CRC) of the PDCCH is scrambled by a cell radio network temporary identifier (C-RNTI).

4. The method according to claim 1, wherein a start moment of the first unit time window is a first symbol that has a random access channel (RACH) resource configured.

5. A beam recovery apparatus, wherein the apparatus comprises:
   a transmitter, configured to send capability of a terminal device to a network device, the capability of the terminal device includes a finite quantity of beams supported by the terminal device for sending beam recovery request;
   a receiver, configured to receive a beam quantity configured by the network device based on the finite quantity of beams from the network device;
   the transmitter is further configured to send a plurality of beam recovery requests to the network device in a first time window using at least one beam, wherein the beam recovery request is a scheduling request or a beam failure recovery request, a quantity of the at least one beam is less than or equal to the beam quantity configured by the network device based on the finite quantity of beams; and
   the receiver is further configured to receive, in the first time window using the at least one beam, a beam recovery request response sent by the network device, wherein the beam recovery request response is a scheduling request response or a beam failure recovery request response;
   wherein the first time window comprises a first unit time window and a second unit time window, and a beginning symbol comprised in the second unit time window is a symbol immediately following a last symbol comprised in the first unit time window; and
   the transmitter is configured to send the plurality of beam recovery requests to the network device on at least one symbol comprised in the first unit time window using at least one same first beam; and
   the receiver is configured to receive the beam recovery request response on at least one symbol comprised in the second unit time window using the at least one same first beam.

6. The apparatus according to claim 5, wherein the plurality of beam recovery requests are sent using a random access channel (RACH) resource.

7. The apparatus according to claim 5, wherein the beam recovery request response is sent using a physical downlink control channel (PDCCH), and a cyclic redundancy check (CRC) of the PDCCH is scrambled by a cell radio network temporary identifier (C-RNTI).

8. The apparatus according to claim 5, wherein a start moment of the first unit time window is a first symbol that has a random access channel (RACH) resource configured.

* * * * *